(12) United States Patent
Wagner

(10) Patent No.: US 6,173,978 B1  
(45) Date of Patent: *Jan. 16, 2001

(54) ZERO ROLL SUSPENSION SYSTEM

(75) Inventor: J. Todd Wagner, Hamden, CT (US)

(73) Assignee: Zero Roll Suspension Corporation, Hamden, CT (US)

( * ) Notice: Under 35 U.S.C. 154(b), the term of this patent shall be extended for 0 days.

This patent is subject to a terminal disclaimer.

(21) Appl. No.: 09/357,684

(22) Filed: Jul. 20, 1999

Related U.S. Application Data

(63) Continuation-in-part of application No. 09/307,628, filed on May 7, 1999.
(60) Provisional application No. 60/111,390, filed on Dec. 8, 1998, and provisional application No. 60/100,830, filed on Sep. 18, 1998.

(51) Int. Cl.[7] .................................................. B60G 3/18
(52) U.S. Cl. ............................ 280/124.128; 280/124.135
(58) Field of Search ............................. 280/5.521, 5.52, 280/124.128, 124.135, 124.145, 124.148

(56) References Cited

U.S. PATENT DOCUMENTS

| | | |
|---|---|---|
| Re. 34,151 | 12/1992 | Murakami et al. . |
| 2,162,067 * | 6/1939 | Dreyer .......................... 280/124.136 |
| 2,776,147 * | 1/1957 | Bamford ........................ 280/124.136 |
| 3,820,812 | 6/1974 | Stubbs et al. . |
| 3,871,467 * | 3/1975 | Senft et al. ........................... 280/124 |
| 3,891,232 | 6/1975 | Flemming . |
| 4,143,887 | 3/1979 | Williams et al. . |
| 4,406,479 | 9/1983 | Chalmers . |
| 4,573,702 | 3/1986 | Klem . |
| 4,589,678 * | 5/1986 | Lund . |
| 4,709,935 * | 12/1987 | Takizawa et al. . |
| 4,753,455 | 6/1988 | Marakami et al. . |
| 4,765,647 * | 8/1988 | Kondo et al. .................. 280/124.128 |
| 4,802,688 | 2/1989 | Murakami et al. . |
| 4,810,002 | 3/1989 | Kakimoto et al. . |
| 4,815,755 * | 3/1989 | Takata et al. .................. 280/124.128 |
| 4,865,347 | 9/1989 | Fukushima et al. . |
| 4,875,703 | 10/1989 | Murakami . |
| 4,883,287 | 11/1989 | Murakami et al. . |
| 4,934,729 | 6/1990 | Murata et al. . |
| 4,948,164 | 8/1990 | Hano et al. . |
| 5,074,582 | 12/1991 | Parsons . |
| 5,098,116 * | 3/1992 | Edahiro et al. . |
| 5,114,177 | 5/1992 | Fukunaga et al. . |
| 5,193,843 | 3/1993 | Yamamoto et al. . |
| 5,284,353 * | 2/1994 | Shinji et al. ................... 280/124.136 |
| 5,388,855 | 2/1995 | Yamamoto et al. . |
| 5,415,427 | 5/1995 | Sommerer et al. . |
| 5,498,019 * | 3/1996 | Adato ............................. 280/124.136 |
| 5,507,510 * | 4/1996 | Kami et al. .................... 280/124.136 |
| 5,821,434 * | 10/1998 | Halliday ........................... 280/5.52 X |

* cited by examiner

Primary Examiner—Peter C. English  
(74) Attorney, Agent, or Firm—McCormick, Paulding & Huber LLP

(57) ABSTRACT

A zero roll suspension system for a vehicle is proposed which includes a vehicle frame and a wheel assembly having an axis of rotation about which a wheel of the wheel assembly rotates. The suspension system substantially eliminates rolling of the vehicle frame and includes a first weight bearing member and a second weight bearing member, each having a first end and a second end. One of the first and second ends of each of the first and second weight bearing members are rotatably connected to a portion of the wheel assembly and the other of the first and second ends of each of the first and second weight bearing members are rotatably connected to the vehicle frame. The first and second weight bearing members are oriented in substantially parallel planes between the wheel assembly and the vehicle frame and cross one another in superposition along a crossing axis, substantially prohibiting the vehicle frame from rolling during a cornering operation of the vehicle.

15 Claims, 14 Drawing Sheets

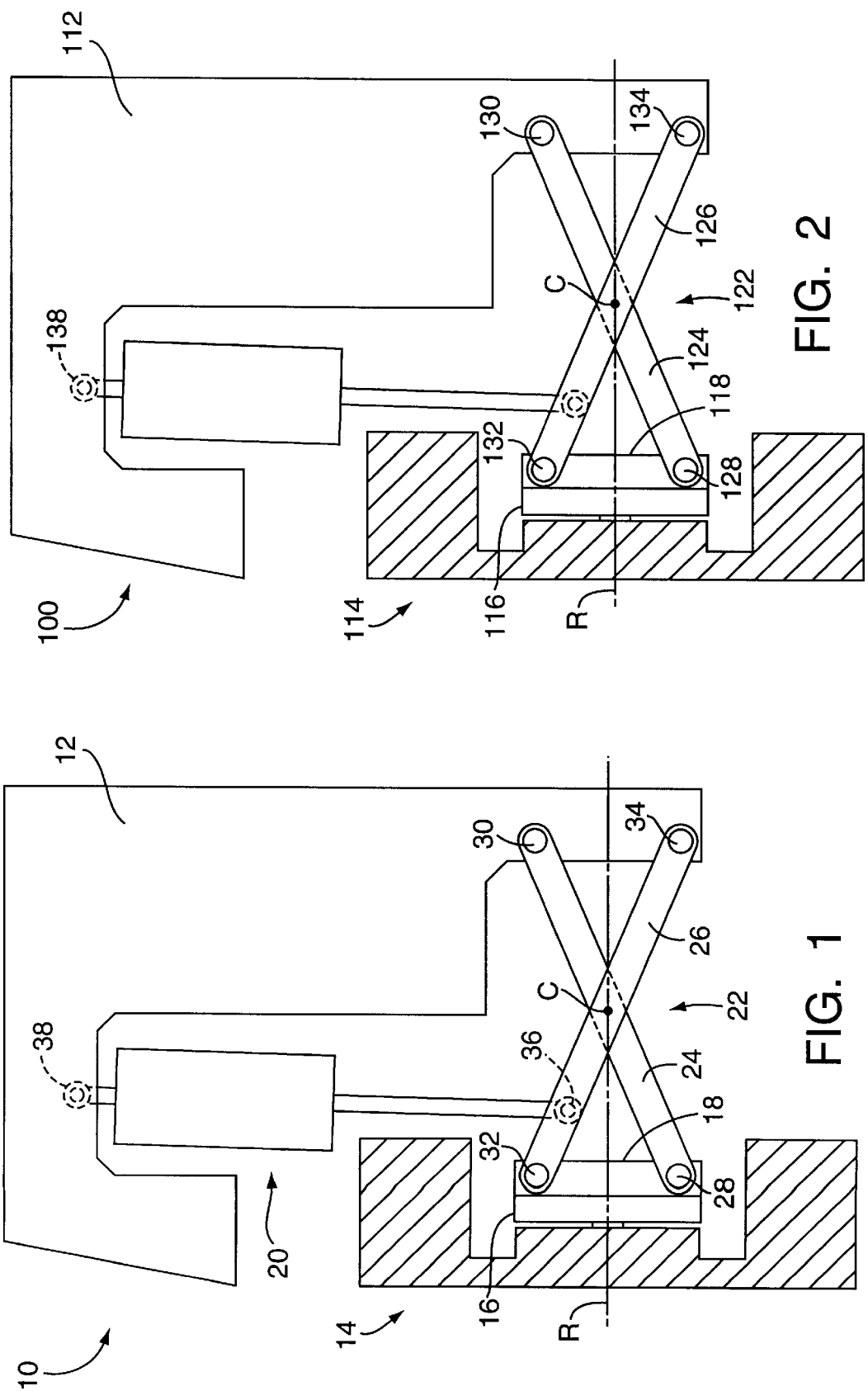

FRONT SUSPENSION SET
FRONT WHEEL DRIVE

REAR SUSPENSION SET

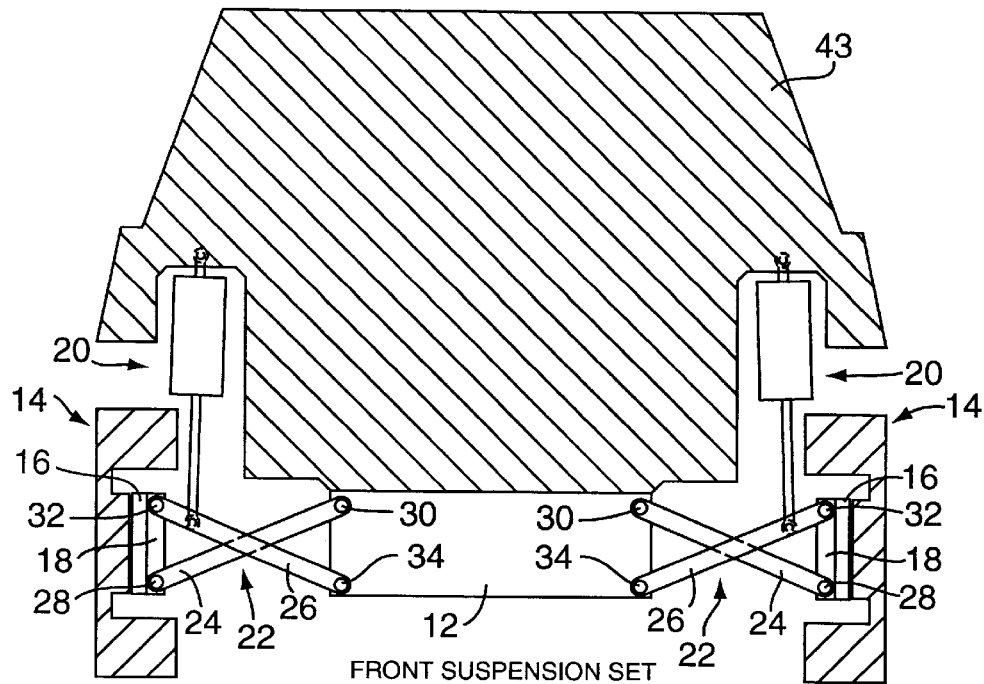
FIG. 7a  FRONT SUSPENSION SET
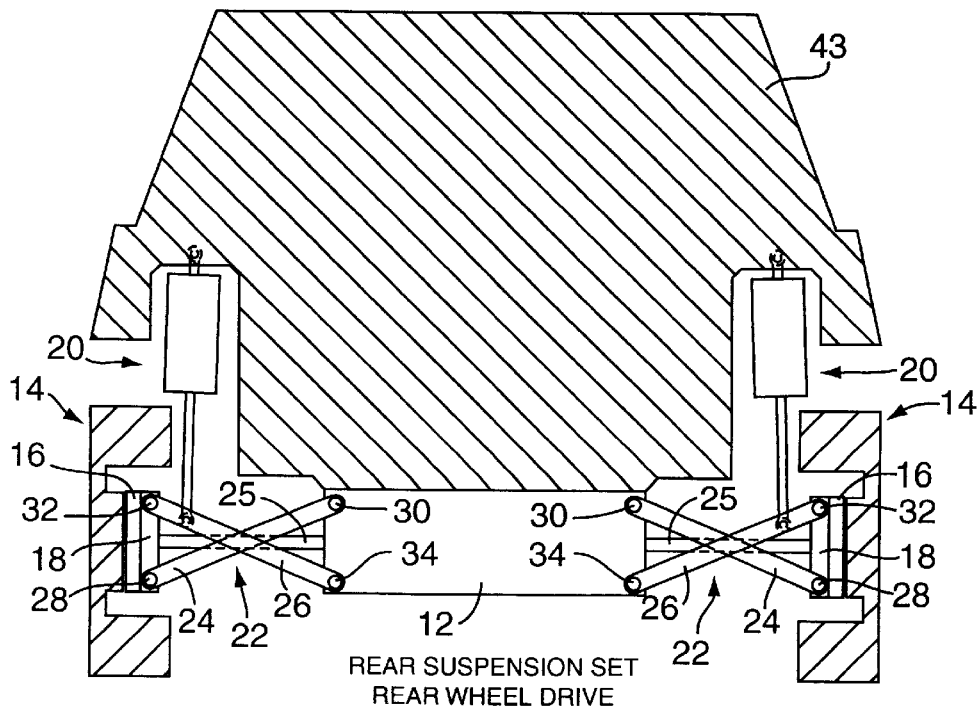
FIG. 7b  REAR SUSPENSION SET REAR WHEEL DRIVE

FRONT SUSPENSION SET
FOUR WHEEL DRIVE/ALL WHEEL DRIVE

REAR SUSPENSION SET
FOUR WHEEL DRIVE/ALL WHEEL DRIVE

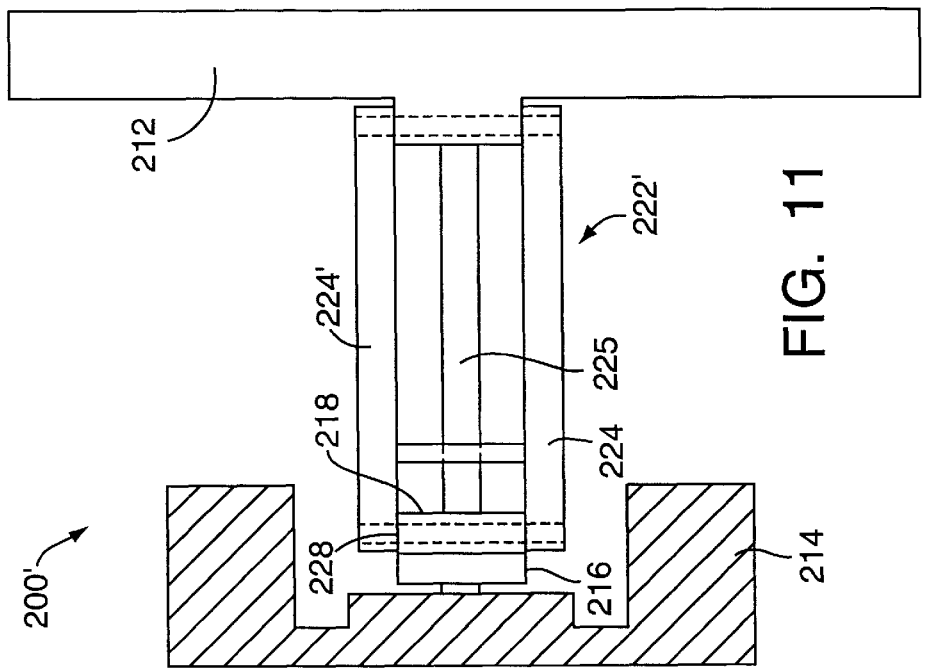
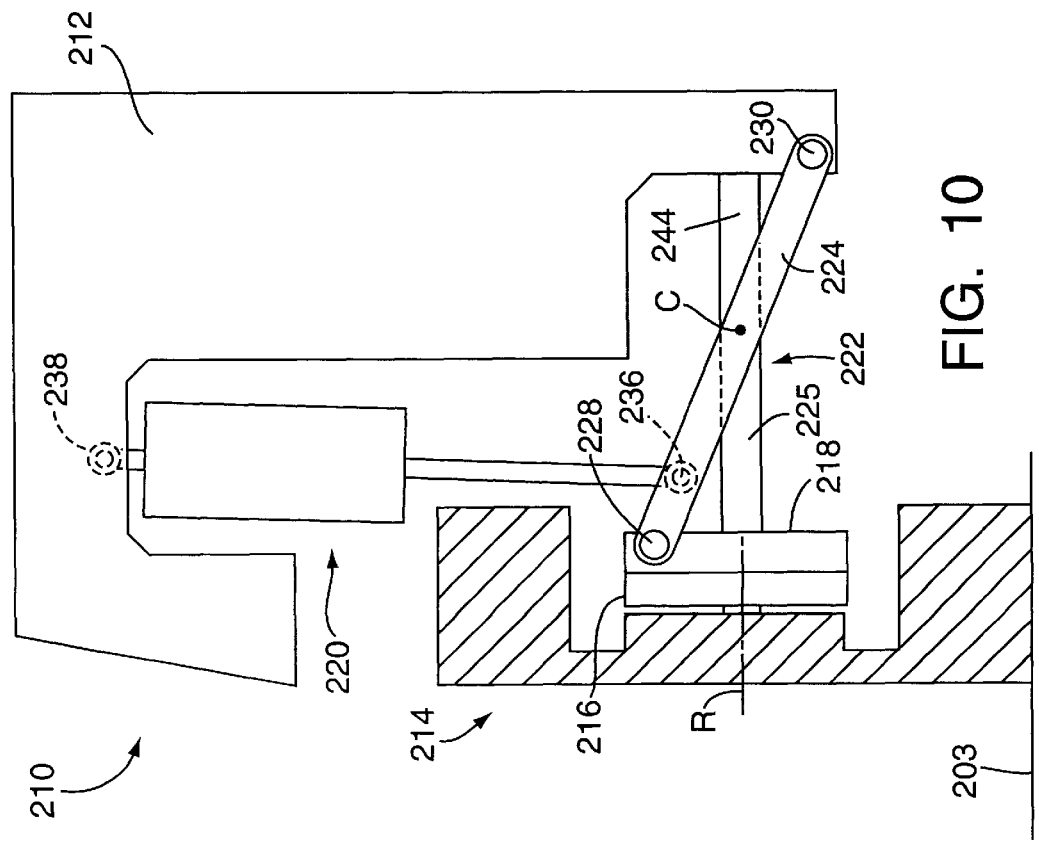

ZERO ROLL SUSPENSION SYSTEM

CROSS REFERENCE TO RELATED APPLICATIONS

This application is a continuation-in-part of pending U.S. patent application Ser. No. 09/307,628 entitled "A Zero Roll Suspension System", filed on May 7, 1999 and herein incorporated by reference in its entirety, which claims the benefit of U.S. Provisional Application Ser. No. 60/111,390, filed on Dec. 8, 1998, and U.S. Provisional Application Ser. No. 60/100,830, filed Sep. 18, 1998.

FIELD OF THE INVENTION

The present invention relates generally to a suspension system for vehicles, and more particularly to a suspension system for controlling the lateral roll of a vehicle during cornering and additionally for controlling fore-aft movement, or pitch, commonly described as vehicle rise and squat, caused by the inertia of the vehicle during acceleration and deceleration.

BACKGROUND OF THE INVENTION

Vehicle suspension characteristics generally determine ride height, spring rates, caster, camber, toe-in, braking dive, acceleration squat, and cornering roll. Anti-roll suspension systems are those in which forces that tend to cause roll of the vehicle body with respect to the wheels about a longitudinal axis are resisted by forces acting through or on the suspension system. Vehicle suspension systems having anti-roll characteristics are generally either 'active' suspensions using hydraulic actuators to adjust suspension characteristics in response to sensed lateral acceleration, or more commonly, suspensions that incorporate devices such as anti-roll or stabilizer bars that have fixed suspension characteristics.

Typical of an 'active' suspension system is U.S. Pat. No. 4,865,347 for Actively Controlled Suspension System Anti-Roll Control, issued to Fukushima et. al. on Sep. 12, 1989, which describes a suspension system having an anti-roll control loop in which the gain is adjusted depending on the speed of the vehicle. The '347 suspension system utilizes acceleration sensors to detect lateral acceleration and pressure control valves to adjust hydraulic cylinders which vary the suspension characteristics according to the speed of the vehicle.

U.S. Pat. No. 4,948,164 for Actively Controlled Suspension System with Compensation of Delay in Phase in Control System, issued to Hano et. al. on Aug. 14, 1990, describes an actively controlled suspension system which can compensate for phase delay caused in a control system and load condition on the vehicle. The active suspension system described in the '164 patent employs a plurality of acceleration sensors for detecting lateral acceleration. Based on the sensed acceleration, anti-rolling suspension control signals are produced for controlling suspension characteristics of left and right-side suspension systems.

U.S. Pat. No. 5,114,177 for Anti-Rolling Controlling System for Automotive Active Suspension System With Road Friction Dependent Variable Control Characteristics, issued to Fukunaga et al. on May 19, 1992, is directed to an active anti-rolling suspension control system having a means for monitoring road friction conditions and a means for distributing rolling moment between front suspension systems and rear suspension systems.

U.S. Pat. No. 3,820,812 for Vehicle Suspension Systems, issued to Stubbs, et. al. on Jun. 28, 1974, is for an active anti-roll suspension control system for four-wheeled road vehicles that have variable-length hydraulic struts acting in series with the front springs controlled by a control unit sensitive to lateral acceleration. The rear suspension anti-roll system is applied by hydraulic cylinders acting on the rear suspension independently of the rear springs and controlled by the control units for the corresponding front struts.

Active anti-roll suspension systems such as those described above have the disadvantage of being relatively complex and have proved too costly to implement in most vehicles. Anti-roll suspension systems with fixed suspension characteristics, in which the anti-roll damping forces do not vary with speed or direction, are also described in the prior art. U.S. Pat. No. 4,573,702 for Anti-Pitch Suspension, issued to Klem on Mar. 4, 1986, for example, is for a vehicle suspension system designed to utilize lateral movement of the body of the vehicle relative to the wheels in order to control the sway or roll of the vehicle body. The '702 suspension system utilizes springs of various types to create an additional means to increase compression or extension of conventional suspension pieces. The principle of the invention may also be used to control dive during braking or squat during acceleration.

U.S. Pat. No. 5,074,582 for Vehicle Suspension System, issued to Parsons on Dec. 24, 1991, depicts a roll frame pivotally mounted transverse of the vehicle, the roll frame having an arm at either end and a wishbone pivotally supported on each arm. Each wishbone forms part of a linkage for supporting a wheel of the vehicle.

U.S. Pat. No. 4,143,887 for Independent Rear Suspension System, issued to Williams et al. on Mar. 13, 1979, depicts a rear suspension utilizing a torsion bar mounted between oppositely disposed wheel carriers and cooperable with laterally extending control arms for providing roll steer characteristics for the rear wheels.

U.S. Pat. Nos. 5,388,855 and 5,193,843 both entitled Suspension System of a Vehicle and both issued to Yamamoto et al. on Feb. 14, 1996 and Mar. 16, 1993, respectively, are directed to a double pivot type suspension system to allow a wheel located radially inward in relation to a turning circle to be turned more sharply than a wheel located radially outward in relation to the turning circle.

U.S. Pat. No. 5,415,427 for Wheel Suspension System, issued to Sommerer et. al. on May 16, 1995, depicts a suspension system comprising a wheel carrier supported on the body side by way of a spring strut. The wheel carrier is guided by two individual links forming an upper pivotal connection and a lower pivotal connection between the wheel and the vehicle body. The pivotal connections are arranged at different angles with respect to the wheel contact plane and, viewed from the top, are arranged to be crossed with respect to one another.

U.S. Pat. No. 4,406,479 for Vehicle Suspension Incorporating Cross-Over Links, issued to Chalmers on Sep. 27, 1983, is directed to a suspension system for a vehicle having a pair of torque rods splayed or outwardly angled relative to the longitudinal axis of the vehicle in which the torque rods cross each other as viewed from the top and are flexibly connected to the vehicle chassis at their inner ends.

Although springs and anti-roll bars described in the prior art reduce cornering roll, there is a trade-off between reduction in roll and the smoothness of the ride. Spring and shock rates that increase the smoothness of the ride counteract the effect of the conventional anti-roll devices described in the prior art. Moreover, such anti-roll devices do not compensate for variations in weight distribution of the vehicle which can also significantly affect rolling characteristics.

OBJECTS AND SUMMARY OF THE INVENTION

It is an object of the present invention to provide an economical anti-roll suspension system for vehicles that reduces cornering roll, acceleration squat and braking dive to nearly zero by using crossed mechanical linkages that cancel rolling moments at each wheel.

It is another object of the present invention to provide an improved anti-roll suspension system that is independent of the weight distribution of the vehicle.

It is yet another object of the present invention to provide an anti-roll suspension system that can be easily modified to allow some frame/body roll out of a corner such that the tops of all wheels are cambered into the corner to improve cornering grip.

It is a further object of the present invention to provide an anti-roll suspension system that can be applied only to the front wheels of a vehicle having a solid axle suspension in order to achieve reduced body roll.

It is a further object of the present invention to provide an anti-roll suspension system that does not require the use of a stabilizer or anti-roll bar.

According to one embodiment of the present invention, a zero roll suspension system is proposed for a vehicle including a vehicle frame and a wheel assembly having an axis of rotation about which a wheel of said wheel assembly rotates.

The suspension system includes a first crossing member and a second crossing member which are adapted to be fixed to the wheel assembly and the vehicle frame so as to cross one another in superposition.

The present invention is directed towards an anti-roll apparatus for vehicles that uses the load moment on the wheel of the vehicle, which is generated by the cornering force at the point of contact between the tire and the road, to cancel out the rolling moment in the vehicle frame and body. The device described herein may be utilized at each independently suspended wheel assembly of a vehicle.

Conventional suspension systems have upper and lower linkages which transmit forces from the wheel to the vehicle body, and generally increase the roll of the vehicle during cornering. The present invention takes advantage of the fact that both the wheel moment and the body roll moment are proportional to the cornering force. By orienting the suspension links such that the links cross each other, the wheel load moment opposes the rolling moment of the vehicle. The anti-roll effect of the present invention can be increased or decreased by changing the vertical distances between the linkage attachment points on the vehicle body and the wheel, as will be hereinafter described.

BRIEF DESCRIPTION OF THE DRAWINGS

FIG. 1 is a partial cross-sectional view of a zero roll suspension system having perpendicular rotational and crossing axes, according to one embodiment of the present invention.

FIG. 2 is a partial cross-sectional view of a zero roll suspension system having a pass through opening in one of the crossed links, according to another embodiment of the present invention.

FIGS. 7a and 7b are partial cross-sectional views of an embodiment of the present invention implemented on a rear wheel drive vehicle.

FIG. 10 is a partial cross-sectional view of a zero roll suspension system implemented in a rear wheel drive vehicle in which the drive shaft acts as one of the crossed links, according to another embodiment of the present invention.

FIG. 11 is a top, partial cross-sectional plan view of a zero roll suspension system according to another embodiment of the present invention in which the drive shaft acts as one of the crossed links.

DETAILED DESCRIPTION OF THE PREFERRED EMBODIMENTS

Figure 2A:
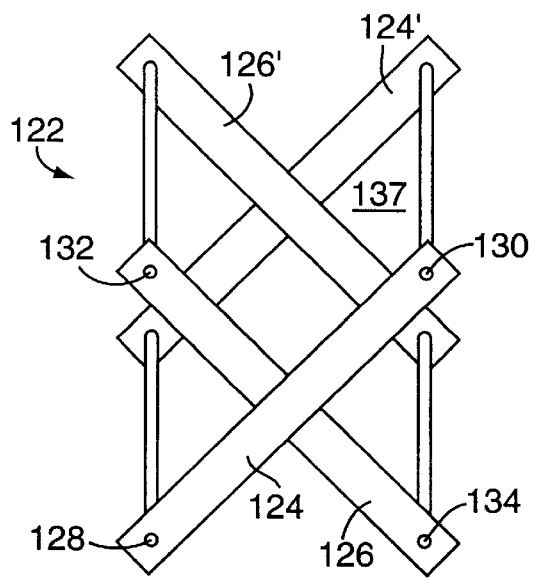
FIG. 2a is a partial perspective view of a linking mechanism, according to the zero roll suspension system of FIG. 2.

Referring to FIG. 1, a suspension system for controlling the lateral roll of a vehicle during cornering, according to one embodiment of the present invention, is generally designated by the reference numeral 10. The suspension system 10 is adapted to be received by the body of a vehicle, such as an automobile frame 12, having a wheel assembly 14, a spindle 16, a kingpin 18, and a spring and shock absorber assembly 20. The wheel assembly 14 has an axis of rotation R about which a wheel of the wheel assembly 14 rotates. The vehicle frame 12 may be of any automobile make or model, such as but not limited to a pick-up truck, an utility truck, a three-wheeled vehicle or a four-wheeled or more wheeled vehicle that tends to rotate or roll during cornering.

The spring and shock absorber assembly 20 provides vertical support for the wheel assembly 14 and the vehicle frame 12 while, as is commonly known, the wheel assembly 14, the spindle 16 and the kingpin 18 are each integrally connected in a conventional manner so as to provide for structural stability and control of the vehicle. The present embodiment of FIG. 1 includes a crossed linking mechanism 22 which acts to connect the wheel assembly 14 to the vehicle body 12. While the suspension system 10 will function with most vehicles, it should be readily apparent that the actual shape and size of various components will depend upon the size and weight of the associated vehicle. It should be readily apparent that while one linking mechanism 22 has been described, more than one linking mechanism may be alternatively substituted without departing from the broader aspects of the present invention, as will be described later.

Referring still to FIG. 1, the linking mechanism 22 of the present invention reverses the moment, preferably at the wheel, to oppose the rolling moment of the vehicle body 12 during cornering. The linking mechanism 22 includes at least a first elongated member 24 and a second elongated member 26 which are oriented so as to cross each other in substantially parallel planes along a crossing axis C. It will be readily apparent that the crossing axis C is not an axis which defines predetermined, fixed points along either the first elongated member 24 or the second elongated member 26. The crossing axis C, as seen in FIG. 1, may initially lie above, below or on the rotational axis R, and will shift from this initial position during operation of the present invention. Moreover, although FIG. 1 illustrates the first elongated member 24 and the second elongated member 26 crossing one another in substantially parallel planes as viewed horizontally, the present invention is not limited in this regard as the first elongated member 24 and the second elongated member 26 may have any planar relationship between one another provided that when viewed horizontally, the first elongated member 24 and the second elongated member 26 cross in superposition.

As shown in FIG. 1, each elongated member, 24 and 26 respectively, are additionally oriented so as to cross the rotational axis R of the wheel assembly 14. The present invention, however, is not limited in this regard as the elongated members 24 and 26 may be oriented between the wheel assembly 14 and the vehicle frame 12 so that they cross one another at a location either above or below the rotational axis R as seen in FIG. 1. Moreover, in the embodiment of FIG. 1, the crossing axis C of the elongated members 24 and 26 is approximately perpendicular to the rotational axis R. It will be readily apparent that the rotational axis R and the crossing axis C are not required to be at any predetermined angle to one another in order for the beneficial aspects of the present invention to be realized. That is, the rotational axis R and the crossing axis C need not necessarily be approximately perpendicular, but rather they may be at any angle to one another, such as but not limited to approximately 0°, 45° or 90°, given a specific configuration of the connection points on the wheel assembly 14 and vehicle frame 12.

The first and second elongated members, 24 and 26 respectively, may be formed from any substantially rigid material including but not limited to metal, a metal-alloy, a composite material or the like. Moreover, each of the first and second elongated members, 24 and 26 respectively, need not be a single unitary element, but rather may be formed from a plurality of mated elements. Preferably, the spring and shock absorber assembly 20 is attached to either the first elongated member 24 or the second elongated member 26 via rotatable pin joint 36, while also being anchored to the vehicle body 12 via rotatable pin joint 38, as shown in FIG. 1. As is further illustrated in FIG. 1, the linking mechanism 22 is fixed to the kingpin 18 at connection points 32 and 28 in any conventional manner so as to enable the linking mechanism 22 to be freely rotatable about connection points 32 and 28 during operation of the suspension system 10. While connection between the shock absorber 20 and either of the elongated members 24 and 26, respectively, has been described and shown in FIG. 1, the present invention is not limited in this regard as the shock absorber 20 may alternatively be connected to either the spindle 16 or the kingpin 18 without departing from the broader aspects of the present invention.

The connection points on the vehicle body 30 and 34, respectively, may be located as shown in FIG. 1 or at other points of the vehicle frame 12. However, in order to provide for a zero roll suspension system, it is preferable that the connection points 30 and 34 be fixed to the vehicle frame 12 at points on the vehicle frame 12 which are approximately horizontally co-planar to the connection points 32 and 28, respectively. In addition, it is preferable that the connection points 32 and 28 are to be rotatably fixed to the spindle 16 or the kingpin 18 so as to be approximately vertically co-planar with one another, while the connection points 30 and 34 are to be rotatably fixed to the vehicle frame 12 so as to be approximately vertically co-planar with one another as well. Moreover, each of the connection points, 30, 34, 32 and 28 respectively, may be fixed to the vehicle frame 12, and the spindle 16 or the kingpin 18, in any conventional manner, such as but not limited to a pin joint or a ball joint, provided that the linking mechanism 22 is freely rotatable about the connection points 30, 34, 32 and 28 during operation of the suspension system 10. By changing the vertical distances between the connection points 32 and 28, as well as between the connection points 30 and 34, the roll reducing effect may be correspondingly increased or decreased, as will be discussed in greater detail in relation to FIG. 4.

The first elongated member 24 must be long enough to reach between a first connection point 28 which, as discussed previously, may be fixed to the kingpin 18 or the spindle 16, and a second connection point 30 on the vehicle body or frame 12 in a substantially passive manner, that is, such that the first elongated member 24 does not cause any active stressing on the vehicle body 12, the spindle 16, the kingpin 18 or the second elongated member 26. Similarly, the second elongated member 26 must be long enough to reach between a first connection point 32, which may be on the kingpin 18 or the spindle 16, and a second connection point 34, which may be on the vehicle body 12, in a largely passive manner, that is, such that the second elongated member 26 does not cause any active stressing on the vehicle body 12, the spindle 16, the kingpin 18 or the first elongated member 24. While the kingpin 18 or the spindle 16 has been described as the preferred anchoring location for the linking mechanism 22, the present invention is not limited in this regard as other, alternative anchoring locations may be substituted so long as the linking mechanism 22 is fixedly attached, on one side thereof, to a portion of the wheel assembly 14 which remains substantially stationary with respect to a turning motion of the wheel itself.

As utilized above with reference to the embodiment of FIG. 1, and hereinafter in conjunction with alternative embodiments of the linking mechanism according to the present invention, the terms 'cross', 'crosses', 'crossed' or 'crossing' represents the relative arrangement of the connection points 28, 30, 32 and 34, or their equivalents in FIGS. 2–17, as viewed horizontally. That is, if the connection point 28 of the elongated member 24 is located vertically below the connection point 32 of the elongated member 26, then the connection point 30 of the elongated member 24 must be oriented vertically above the connection point 34 of the elongated member 26.

In operation, the suspension system 10 as illustrated in FIG. 1 acts to reverse the rolling load moment at the wheel of the vehicle and transfers this reversed rolling load moment to the vehicle frame 12. The rolling load moment is typically generated by the force at the portion of the wheel contacting a travel surface during operation of the vehicle, such as but not limited to a cornering, acceleration or braking of the vehicle, or the like.

FIG. 2 illustrates another embodiment of the zero roll suspension system of the present invention, generally designated by numeral 100. While FIG. 1 depicts first and second single elongated members, 24 and 26 respectively, crossing in approximately parallel vertical planes, FIG. 2 illustrates the suspension system 100 wherein the linking mechanism 122 includes two, nested pairs of elongated members, 124/124' and 126/126', respectively. The partial perspective view of FIG. 2a more clearly illustrates the nested pairs of elongated members 124/124' and 126/126' which comprise the linking mechanism 122 of the suspension system 100.

The two pairs of elongated members, 124/124' and 126/126' respectively, physically intersect one another by way of a pass-through opening 137 defined between the outermost pair of elongated members 124/124'. It should be readily apparent that the pass-through opening 137 must be fashioned so as to be somewhat larger in width than the width of the elongated member pair which is situated within the pass-through opening 137. This arrangement and size of the pass-through opening 137 allows for the compensating movement of the pair of elongated members, 126 /126' respectively, relative to the outermost pair of elongated members 124/124'. In the embodiment shown in FIG. 2, the crossing axis C of the two pairs of elongated members 124/124' and 126/126' is approximately perpendicular to the rotational axis R, however, as mentioned previously, this angular relationship is not critical to the operation of the present invention and may be any angle, such as but not limited to approximately 0°, 45° or 90°. It will be readily apparent that the two pairs of elongated members, 124/124' and 126/126' respectively, are fashioned so as to minimize any frictional contact between one another, wherein no contact at all is the preferred arrangement.

Figure 3:
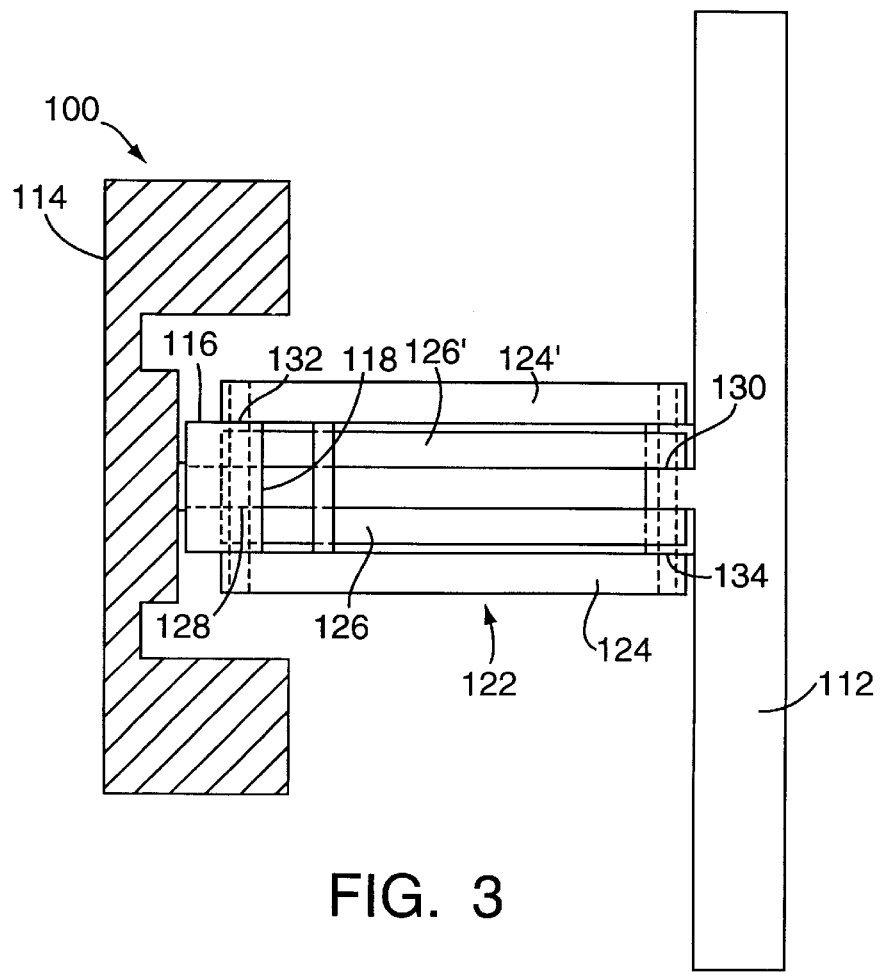
FIG. 3 is a top, partial cross-sectional plan view of a zero roll suspension system according to the zero roll suspension system of FIG. 2.

FIG. 3 illustrates a top, partial cross-sectional plan view of the suspension system 100. As discussed above, the suspension system 100 is such that the linking mechanism 122 includes two nested pairs of elongated members, 124/124' and 126/126', respectively All four elongated members, 124, 124', 126 and 126', are shown as being fixed to the wheel assembly 114 and the vehicle body 112 in a manner similar to the discussion of the suspension system 10 of FIG. 1. The first elongated members, 124 and 124' respectively, are depicted as an outside link between the wheel assembly 114 and the vehicle frame 112, while the second pair of elongated members, 126 and 126' respectively, are shown as an inside link between the wheel assembly 114 and the vehicle frame 112 crossing the first pair of elongated members, 124 and 124', in parallel vertical planes. This particular arrangement and number of stabilizing elongated members 124, 124', 126 and 126', provides for compensation of the rolling load moment of a cornering vehicle, but with even greater stability and compensation capabilities than the suspension system 10 of FIG. 1.

Figure 4:
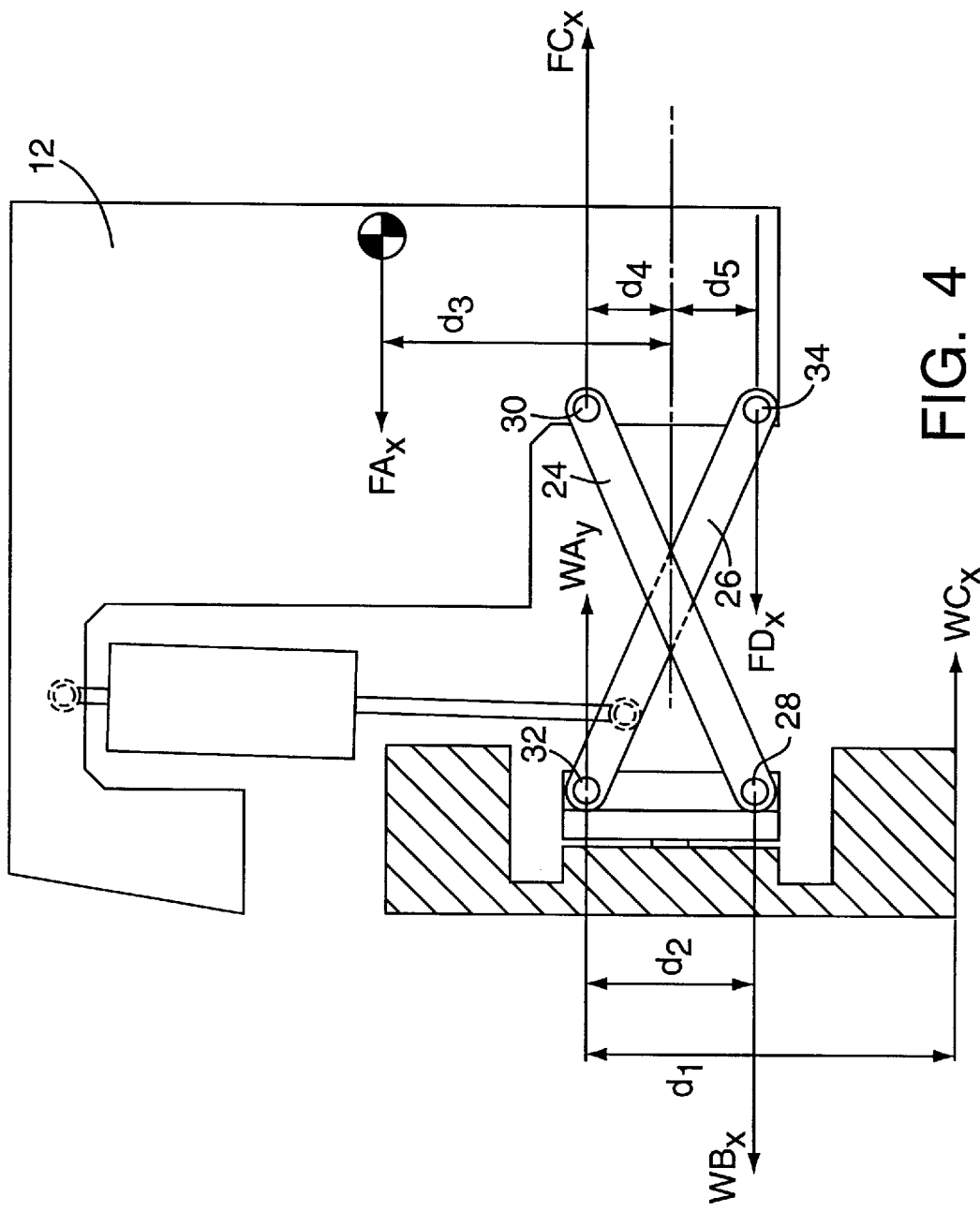
FIG. 4 is a partial cross-sectional view of the forces which interact in the zero roll suspension system of FIG. 1.
Figure 5:
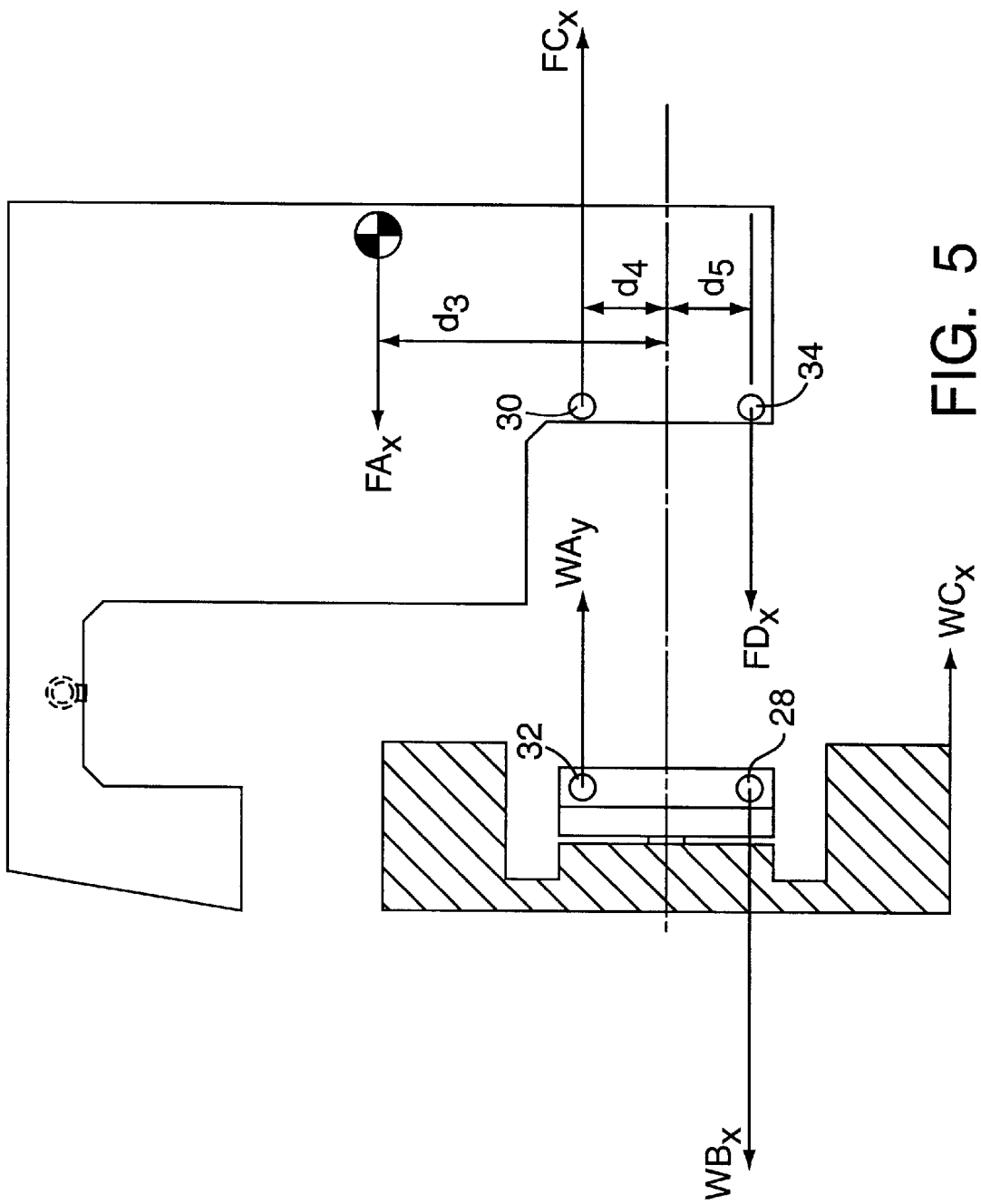
FIG. 5 illustrates a free body diagram of the forces which interact in the zero roll suspension system of FIG. 1.

The orientation and interaction of forces with respect to the embodiment illustrated in FIG. 1, and similar to the orientation and interaction of forces as illustrated in further embodiments of the present invention, are shown schematically in FIGS. 4 and 5. Referring to FIG. 4, the forces on a vehicle traveling forward (into the paper) and turning right are depicted. The lateral or radial acceleration on the frame of the vehicle 12 gives rise to force $FA_X$ which causes the vehicle to rotate or roll during cornering. Friction between the wheel assembly 14 and the road creates a cornering force shown as force vector $WC_X$, the magnitude of which is determined by the weight and speed of the vehicle. For a four wheeled vehicle with ¼ of the weight on each tire:

$$WC_X = \frac{\text{mass vehicle} \times \text{lateral acceleration}}{4}$$

Lateral forces that the elongated members, 24 and 26 respectively, apply to the connection points 32, 28, 30 and 34 are shown as force vectors $WA_X$, $WB_X$, $FC_X$ and $FD_X$ respectively, where:

$WB_X = -FC_X$ and $WA_X = -FD_X$

Given distances $d_1$ and $d_2$, $WB_X$ can be calculated by summing the moments of forces $WC_X$ and $WB_X$ about connection point 32:

$$\Sigma M = 0 = (d_1)WC_X + (d_2)WB_X$$

Using the values thus determined for $WC_X$ and $WB_X$, $WA_X$ can be calculated by summing the force vectors in the x-direction:

$$\Sigma F_X = 0 = WC_X - WB_X + WA_X$$

The roll canceling ability of the present invention can be decreased by either increasing the distance $d_2$, or by decreasing the distance $(d_4+d_5)$. Conversely, the roll canceling ability of the present invention can be increased either by decreasing the distance $d_2$, or increasing the distance $(d_4+d_5)$. Accordingly, it is the vertical distances between the connection points which primarily affect the roll canceling ability of the present invention, while any changes in the horizontal distances between the connection points will primarily affect the cambering of the wheel during operation of the vehicle.

Referring to the free body diagram depicted in FIG. 5 and the formula below, the body rolling moment $M_R$ is calculated about the projected intersection of the elongated members 24, and 26 (unillustrated in FIG. 5) which is midway between connection points 30 and 34.

$$\Sigma M_R = (d_3)FA_X - (d_4)FC_X - (d_5)FD_X$$

By selectively choosing the distance between connection points 30 and 34, the body roll moment can be made to approach zero.

In the embodiments of the suspension systems 10 and 100, as depicted in FIGS. 1–3, the elongated members cross each other in parallel vertical planes and connect the wheel assembly 14, 114 to the vehicle frame 12, 112. In the suspension system 100 as depicted in FIGS. 2–3, each of the two linking mechanisms 122 has pairs of inside and outside elongated members, 124/124' and 126/126' respectively, rotatably fixed to the wheel assembly 114 and to the vehicle frame 112. As described previously, the outside links 124/

124' are attached to either the kingpin 118 or spindle 116 at points 128 and to the vehicle body 112 at points 130. The inside links 126/126' are attached to either the kingpin 118 or the spindle 116 at points 132, vertically above or below points 128, and to the vehicle body 112 at points 134, vertically above or below points 130, such that the outside and inside links, 124/124' and 126/126' respectively, are arranged in a crossed pattern.

Figure 6A:
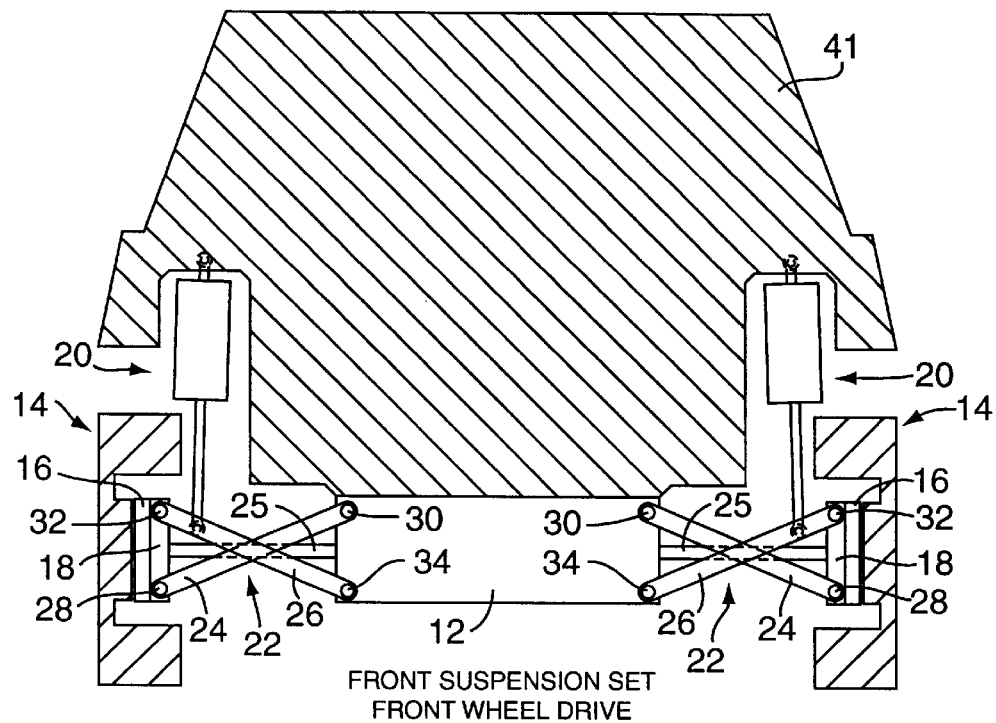
FIGS. 6a and 6b are partial cross-sectional views of an embodiment of the present invention implemented on a front wheel drive vehicle.
Figure 6B:
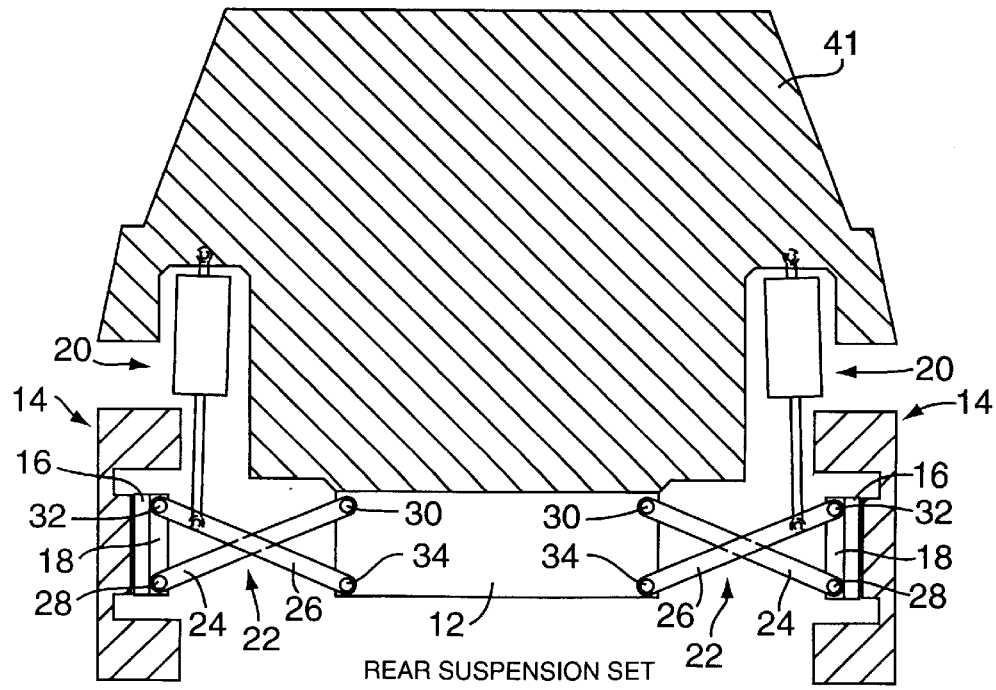

FIGS. 6a and 6b illustrate a partial cross-sectional view of the suspension system 10 of FIG. 1 being incorporated into a front wheel drive vehicle 41. FIG. 6a illustrates the front end of the front wheel drive vehicle 41, including a drive shaft 25 in relation to the linking mechanisms 22 affixed between each wheel assembly 14 and the vehicle frame 12. It should be readily apparent that the drive shaft 25 does not interfere with the application of the linking mechanisms 22 during the operation of the suspension system 10 as described previously in conjunction with FIG. 1.

FIG. 6b illustrates the back end of the front wheel drive vehicle 41, including the linking mechanisms 22 affixed between each wheel assembly 14 and the vehicle frame 12. While the linking mechanism 22, including single elongated members 24 and 26, is shown as being affixed between each wheel assembly 14 and the vehicle frame 12 in the cross-sectional view of FIGS. 6a and 6b, the present invention is not limited in this regard as pairs of linking mechanisms may be affixed at each wheel assembly 14 location, similar to the arrangement illustrated in FIGS. 2–3, without departing from the broader aspects of the present invention.

Figure 8A:
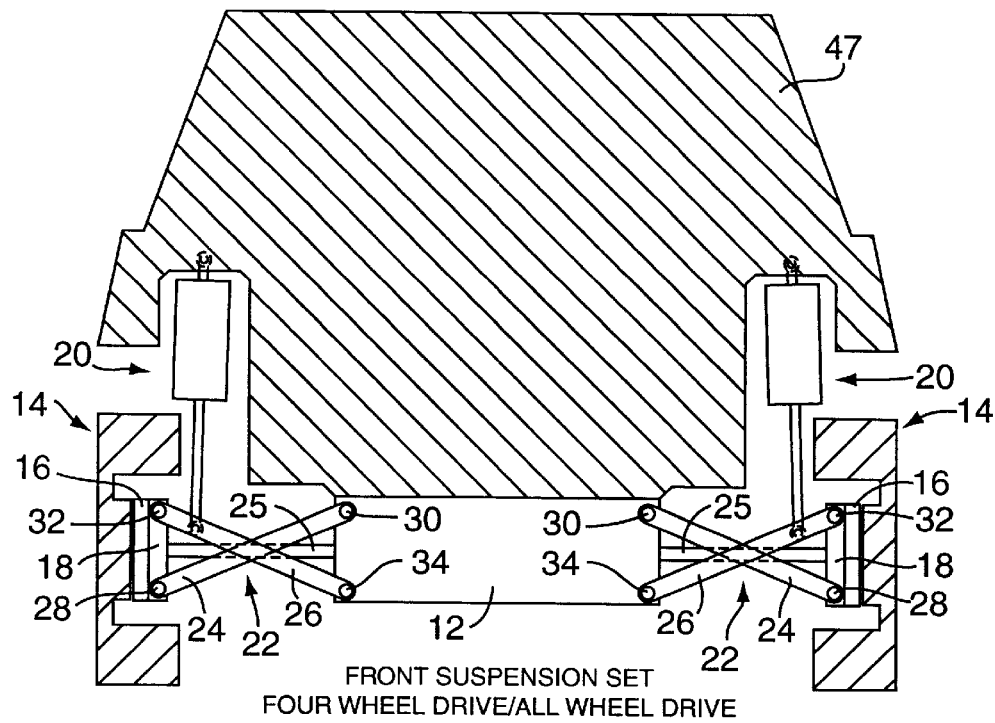
FIGS. 8a and 8b are partial cross-sectional views of an embodiment of the present invention implemented on a four wheel drive vehicle.
Figure 8B:
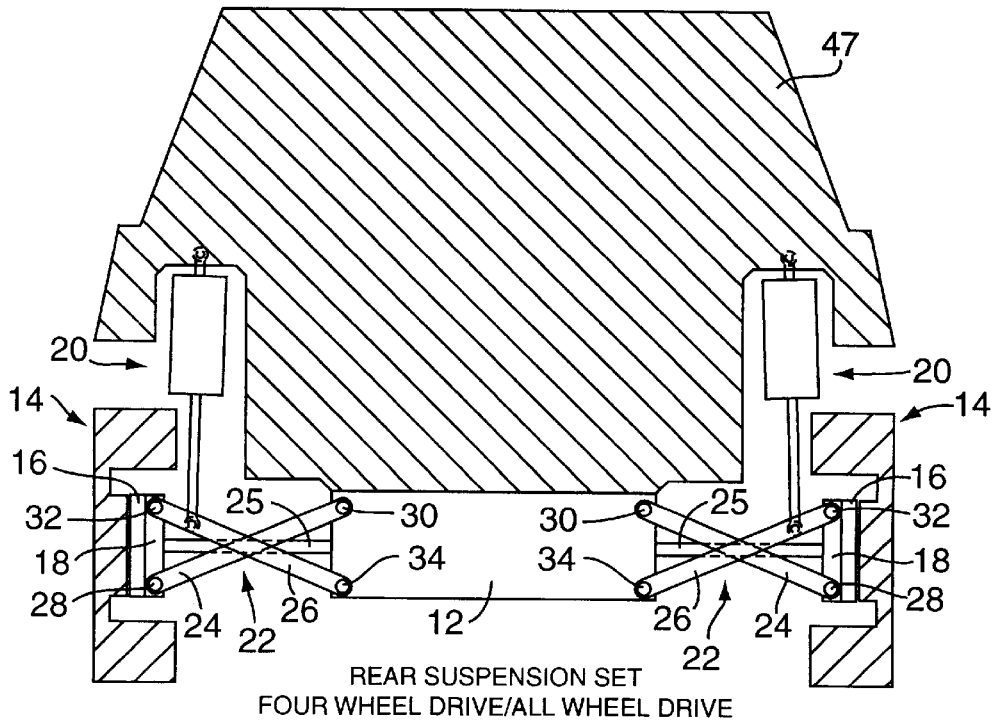
Figure 9A:
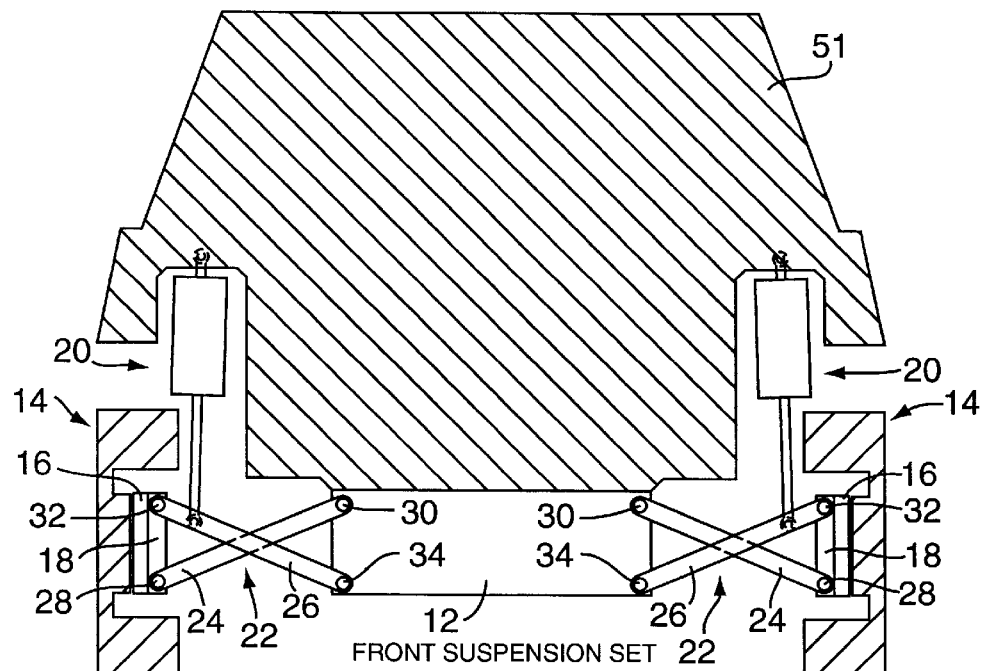
FIGS. 9a and 9b are partial cross-sectional views of an embodiment of the present invention implemented in a vehicle having in hub motors instead of a drive shaft.
Figure 9B:
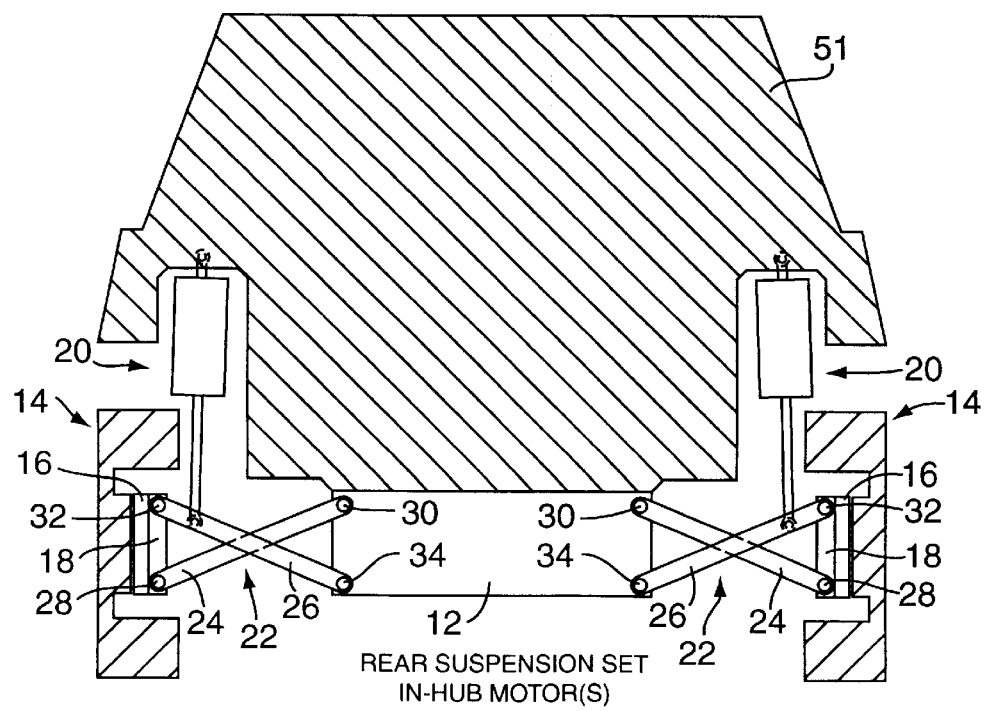

In a similar fashion to the application as shown in FIGS. 6a and 6b, the linking mechanism 22 may be implemented at each wheel assembly 14 on a rear wheel drive vehicle 43, as depicted schematically in FIGS. 7a and 7b. The linking mechanism 22 may also be implemented at each wheel assembly 14 on a four-wheel drive vehicle 47 as shown in FIGS. 8a and 8b, or on a vehicle 51 having in hub motors as shown in FIGS. 9a and 9b. While the linking mechanism 22, including single elongated members 24 and 26, is shown as being affixed between each wheel assembly 14 and the vehicle frame 12 in the cross-sectional views of FIGS. 7a, 7b, 8a, 8b, 9a and 9b, the present invention is not limited in this regard as pairs of linking mechanisms may be affixed at each wheel assembly 14 location, similar to the arrangement illustrated in FIGS. 2–3, without departing from the broader aspects of the present invention.

An additional aspect of the present invention is the application of a zero roll suspension system to only some of the wheel assembly locations of a given vehicle, such as to the front or rear wheels only, while the other wheel assembly locations are equipped with alternative suspension systems, such as struts. When applied in this manner, although roll cancellation may not be balanced, substantial compensation of the vehicle roll encountered during cornering, acceleration and braking may still be obtained.

FIG. 10 illustrates a partial cross-sectional view of yet another embodiment of the suspension system of the present invention, generally designated by reference numeral 200. The suspension system 200 utilizes a drive shaft 225 to act as either one of the two elongated members in linking mechanism 222. The drive shaft 225 passes through the center of the spindle 216 and is attached thereto in a conventional manner. The drive shaft 225 is also connected to a fixed portion of a largely unillustrated drive train 244 in a conventional manner. The draft shaft 225 provides structural support between the wheel assembly 214 and the vehicle body 212 and is substantially co-axial with the rotational axis R of the wheel assembly 214. A shock absorber 220 provides vertical support for the wheel assembly 214 and the vehicle frame 212. Preferably, the shock absorber 220 is fixedly attached to a single elongated member 224 via rotatable pin joint 236. It will be readily appreciated that the shock absorber 220 may be of any type, such as but not limited to a spring shock absorber, a gas shock absorber or a hydraulic shock absorber, and further, that the shock absorber 220 may be fixed by the rotatable pin joint 236 to any point along the single elongated member 224, or to any conventional location on the wheel assembly 214, including the spindle 216 and the kingpin 218, in dependence upon the particular suspension design of a specific vehicle, without departing from the broader aspects of the present invention.

Referring still to FIG. 10, the single elongated member 224 is rotatably fixed to the kingpin 218 at a connection point 228 and to the vehicle body 212 at a connection point 230. The vertical orientation of these connection points, 228 and 230 respectively, are functionally interchangeable in that either may be located higher than the other with respect to the plane of the driving surface 203, provided that the connection points, 228 and 230 respectively, are positioned such that the single elongated member 224 and the drive shaft 225 are inclined with respect to one another so as to cross in substantially parallel vertical planes along a crossing axis C.

FIG. 11 illustrates a top, partial cross-sectional view of yet another embodiment of a suspension system according to the present invention, generally designated by the reference numeral 200'. The suspension system 200' is similar to the suspension system 200, illustrated in FIG. 10, in its utilization of the drive shaft 225 as a support member. The suspension system 200', however, utilizes a pair of two similarly inclined elongated members, 224 and 224' respectively, situated on either planar side of the drive shaft 225, as shown in FIG. 11, where the drive shaft 225 is shown as the inside link of the linking mechanism 222'. The present embodiment, therefore, contemplates including the pair of elongated members, 224 and 224' respectively, in a manner similar to the utilization of the two pairs of elongated members as shown and described in conjunction with FIGS. 2–3.

In accordance with the previous embodiments of the present invention, the elongated members, 224 and 224' respectively, are rotatably fixed between the vehicle frame 212 and either the spindle 216 or the kingpin 218 on the wheel assembly 214.

Figure 12A:
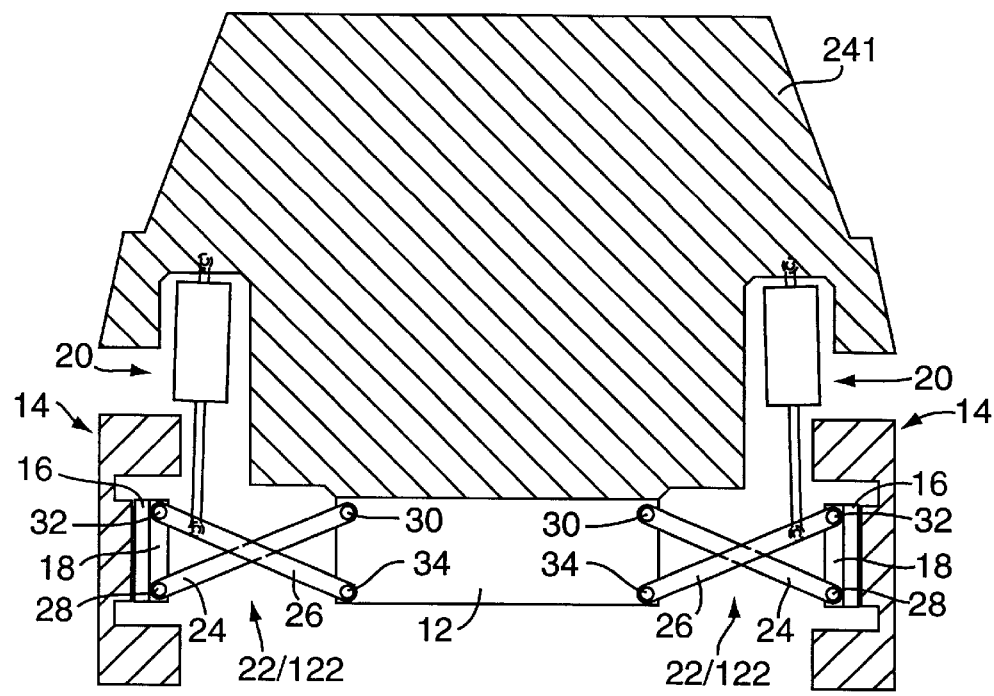
FIGS. 12a and 12b are schematic views of an embodiment of the present invention implemented on a rear wheel drive vehicle in which the drive shaft acts as one of the crossed links.
Figure 12B:
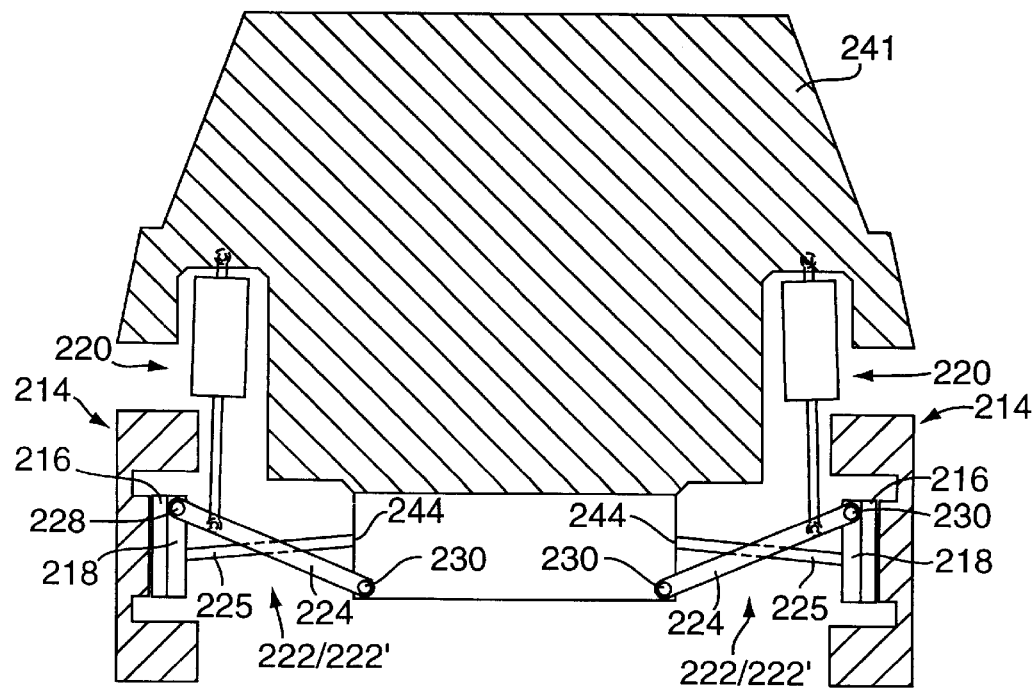

As shown in FIGS. 12a and 12b, the linking mechanisms, 22 and 222 respectively, are implemented on each of the four wheel assemblies 14, 214 of a vehicle 241. Vehicle 241 may be either a front wheel drive vehicle or a rear wheel drive vehicle wherein FIG. 12a illustrates those wheel assemblies 214 which are not actively driven in the front or rear wheel drive vehicle 241, and FIG. 12b illustrates those wheel assemblies 214 which utilize a drive shaft 225 and are actively driven in the front or rear wheel drive vehicle 241. In the suspension system integrated into the wheel assemblies 214 shown in FIG. 12b, the drive shaft 225 serves as one of the elongated members crossing elongated member 224 to form the crossed linking mechanisms, 222 or 222' respectively, illustrated in FIGS. 10 or 11. Moreover, FIG. 12a illustrates those wheel assemblies 14, 214 which do not utilize a drive shaft 225, but rather utilize the linking mechanisms, 22 or 122 respectively, affixed between each wheel assembly 14, 214 and the vehicle frame 212 in arrangements as previously described in relation to FIGS. 1–3.

More specifically, FIG. 12b illustrates one end of the vehicle 241 including the linking mechanisms 222 or 222', shown in FIGS. 10 and 11, affixed between each wheel assembly 214 and the vehicle frame 212, wherein the drive shaft 225 provides structural support between the wheel assembly 214 and the vehicle body 212. It should be readily apparent that the drive shaft 225 does not interfere with the application of the linking mechanisms 222 or 222' during the operation of the suspension system 200 or 200'.

Figure 13:
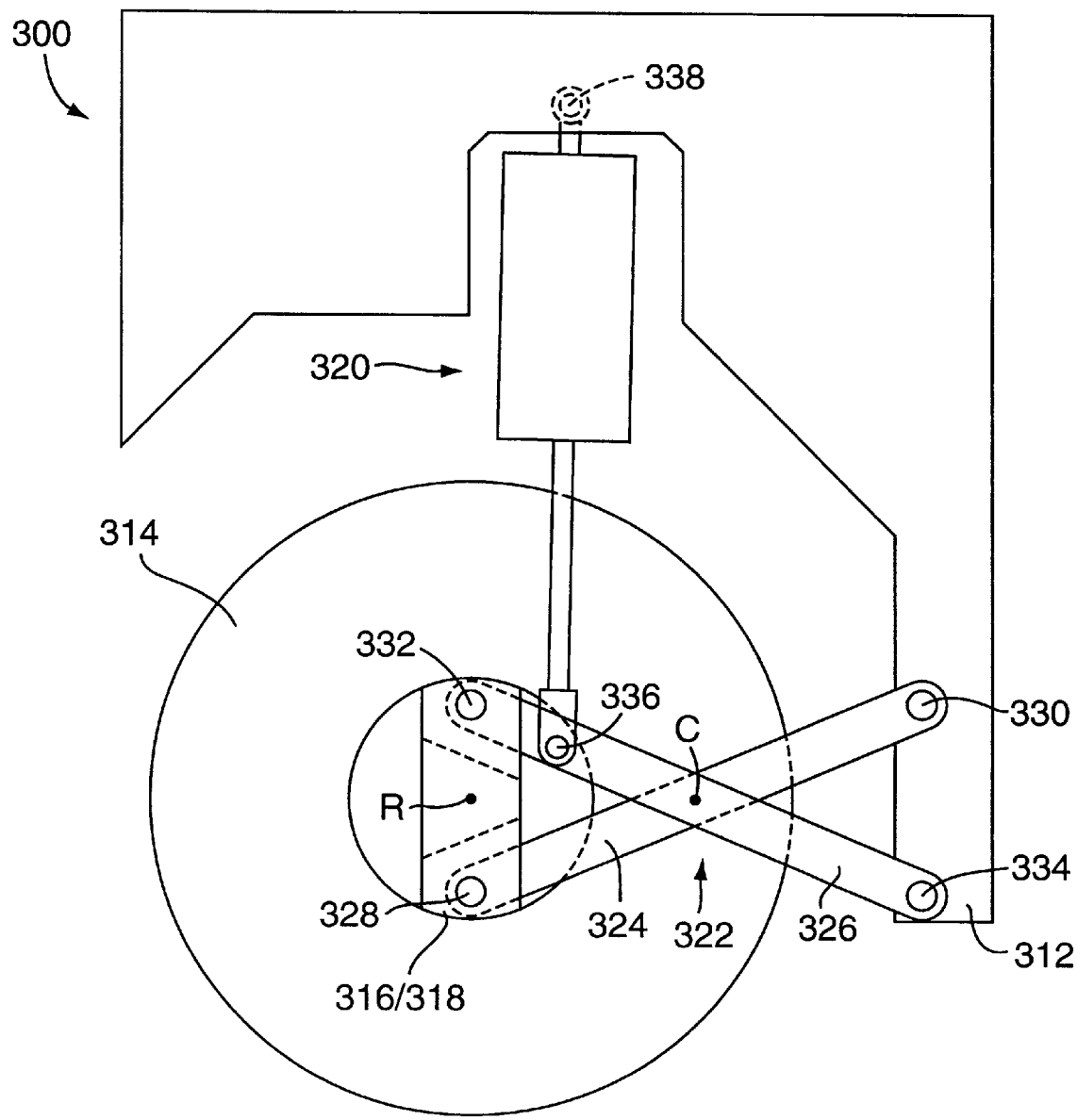
FIG. 13 is a partial cross-sectional view of a zero roll suspension system having parallel rotational and crossing axes, according to another embodiment of the present invention.

The embodiments of the present invention as illustrated in FIGS. 1–12b have shown various specific arrangements of a zero roll suspension system, as well as disclosing how various specific designs of such a zero roll suspension system may be combined to accommodate differing vehicle types and desired ride characteristics. As is evident in the embodiments shown in FIGS. 1–12b, the linking mechanism between the wheel assembly and the vehicle frame has been shown for illustration purposes as having a crossing axis C which is oriented approximately perpendicular to the rotational axis R of the wheel assembly. In the alternative, FIG. 13 illustrates yet another embodiment of a zero roll suspension system, designated by the reference numeral 300, wherein the linking mechanism between the wheel assembly and the vehicle frame has a crossing axis C which is oriented approximately parallel to the rotational axis R of the wheel assembly 314. It will be readily apparent that the rotational axis R and the crossing axis C are not required to be at any predetermined angle to one another in order for the beneficial aspects of the present invention to be realized. That is, the rotational axis R and the crossing axis C need not necessarily be approximately parallel, but rather may be at any angle to one another, such as but not limited to approximately 0°, 45° or 90°, given a specific configuration of the connection points on the wheel assembly 314 and vehicle frame 312.

More specifically, the suspension system 300 is adapted to be received by the body of a vehicle, such as an automobile frame 312, having a wheel assembly 314, a spindle 316, a kingpin 318, and a spring and shock absorber assembly 320. The wheel assembly 314 has an axis of rotation R about which a wheel of the wheel assembly 314 rotates. The vehicle frame 312 may be of any automobile make or model, a pick-up truck, an utility truck, a three-wheeled, a four-wheeled or more wheeled vehicle that tends to rotate or roll, during cornering.

The spring and shock absorber assembly 320 provides vertical support for the wheel assembly 314 and the vehicle frame 312 while, as is commonly known, the wheel assembly 314, the spindle 316 and the kingpin 318 are each integrally connected in a conventional manner so as to provide for structural stability and control of the vehicle. While the suspension system 300 will function with most vehicles, it should be readily apparent that the actual size of various components will depend upon the size and weight of the associated vehicle. It should be readily apparent that while one linking mechanism 322 has been described, more than one linking mechanism may be alternatively substituted without departing from the broader aspects of the present invention, as will be described later.

Referring still to FIG. 13, the linking mechanism 322 of the present invention reverses the moment, preferably at the wheel, to oppose the rolling moment of the vehicle body 312 during cornering. The linking mechanism 322 includes at least a first elongated member 324 and a second elongated member 326 which are oriented so as to cross the plane containing the each other in parallel planes along a crossing axis C. Each elongated member, 324 and 326 respectively, are additionally oriented so as to cross the plane containing the the rotational axis R of the wheel assembly 314. The present invention, however, is not limited in this regard as the elongated members 324 and 326 may be oriented between the wheel assembly 314 and the vehicle frame 312 so that they cross one another at a location either above or below the rotational axis R as seen in FIG. 13. Moreover, in the embodiment of FIG. 13, the crossing axis C of the elongated members 324 and 326 is approximately parallel to the rotational axis R. It will be readily apparent that the rotational axis R and the crossing axis C are not required to be at any predetermined angle to one another in order for the beneficial aspects of the present invention to be realized. As noted above, the rotational axis R and the crossing axis C need not necessarily be approximately parallel, but rather they may be at any angle to one another given a specific configuration of the connection points on the wheel assembly 314 and vehicle frame 312.

The first and second elongated members 324 and 326 may be formed from a metal, a metal-alloy or the like, provided they remain substantially rigid. Preferably, the spring and shock absorber assembly 320 is attached to either the first elongated member 324 or the second elongated member 326 via rotatable pin joint 336, while also being anchored to the vehicle body 312 via rotatable pin joint 338. As is further illustrated in FIG. 13, the linking mechanism 322 is fixed to the kingpin 318 at connection points 332 and 328 in any conventional manner so as to enable the linking mechanism 322 to be freely rotatable about connection points 332 and 328 during operation of the suspension system 300. While connection between the shock absorber 320 and either of the elongated members, 324 and 326 respectively, has been described and shown in FIG. 13, the present invention is not limited in this regard as the shock absorber 320 may alternatively be rotatably fixed to either the spindle 316 or the kingpin 318 without departing from the broader aspects of the present invention.

The connection points on the vehicle body 330 and 334, respectively, may be located as shown at in FIG. 13 or at other points of the vehicle frame 312, however, it is preferable that the connection points 330 and 334 be fixed to the vehicle frame 312 at points on the vehicle frame 312 which are approximately horizontally co-planar to the connection points 332 and 328, respectively. In addition, it is preferable that the connection points 332 and 328 are to be rotatably fixed to either the spindle 316 or the kingpin 318 so as to be approximately vertically co-planar with one another, while it is preferable that the connection points 330 and 334 are to be rotatably fixed to the vehicle frame 312 so as to be approximately vertically co-planar with one another as well. Moreover, each of the connection points, 330, 334, 332 and 328 respectively, may be fixed to the wheel assembly 314, including either the spindle 316 or the kingpin 318, and to the vehicle frame 312 in any conventional manner, such as but not limited to a pin joint or a ball joint, provided that the linking mechanism 322 is freely rotatable about the connection points 330, 334, 332 and 328 during operation of the suspension system 300. It will be readily apparent that by changing the vertical distances between the connection points 332 and 328, as well as between the connection points 330 and 334, the roll reducing effect may be correspondingly increased or decreased.

The first elongated member 324 must be long enough to reach between a first connection point 328 which, as discussed previously, may be fixed to the kingpin 318 or the spindle 316, and a second connection point 330 on the vehicle body or frame 312 in a substantially passive manner, that is, such that the first elongated member 324 does not cause any active stressing on the vehicle body 312, the spindle 316, the kingpin 318 or the second elongated member 326. Similarly, the second elongated member 326 must be long enough to reach between a first connection point 332, which may be on the kingpin 318 or the spindle 316, and a second connection point 334, which may be on the vehicle body 312, in a largely passive manner, that is, such that the second elongated member 326 does not cause any active stressing on the vehicle body 312, the spindle 316, the kingpin 318 or the first elongated member 324. While the kingpin 318 or the spindle 316 has been described as the preferred anchoring location for the linking mechanism 322, the present invention is not limited in this regard as other, alternative anchoring locations may be substituted so long as the linking mechanism 322 is fixedly attached to a portion of the wheel assembly 314 which remains substantially stationary with respect to a turning motion of the wheel itself.

In operation, the suspension system 300 as illustrated in FIG. 13 acts to reverse the rolling load moment at the wheel of the vehicle and transfers this reversed rolling load moment to the vehicle frame 312. The rolling load moment is typically generated by the force at the portion of the wheel contacting a travel surface during operation of the vehicle, such as but not limited to a cornering, acceleration or braking of the vehicle, or the like.

Figure 14:
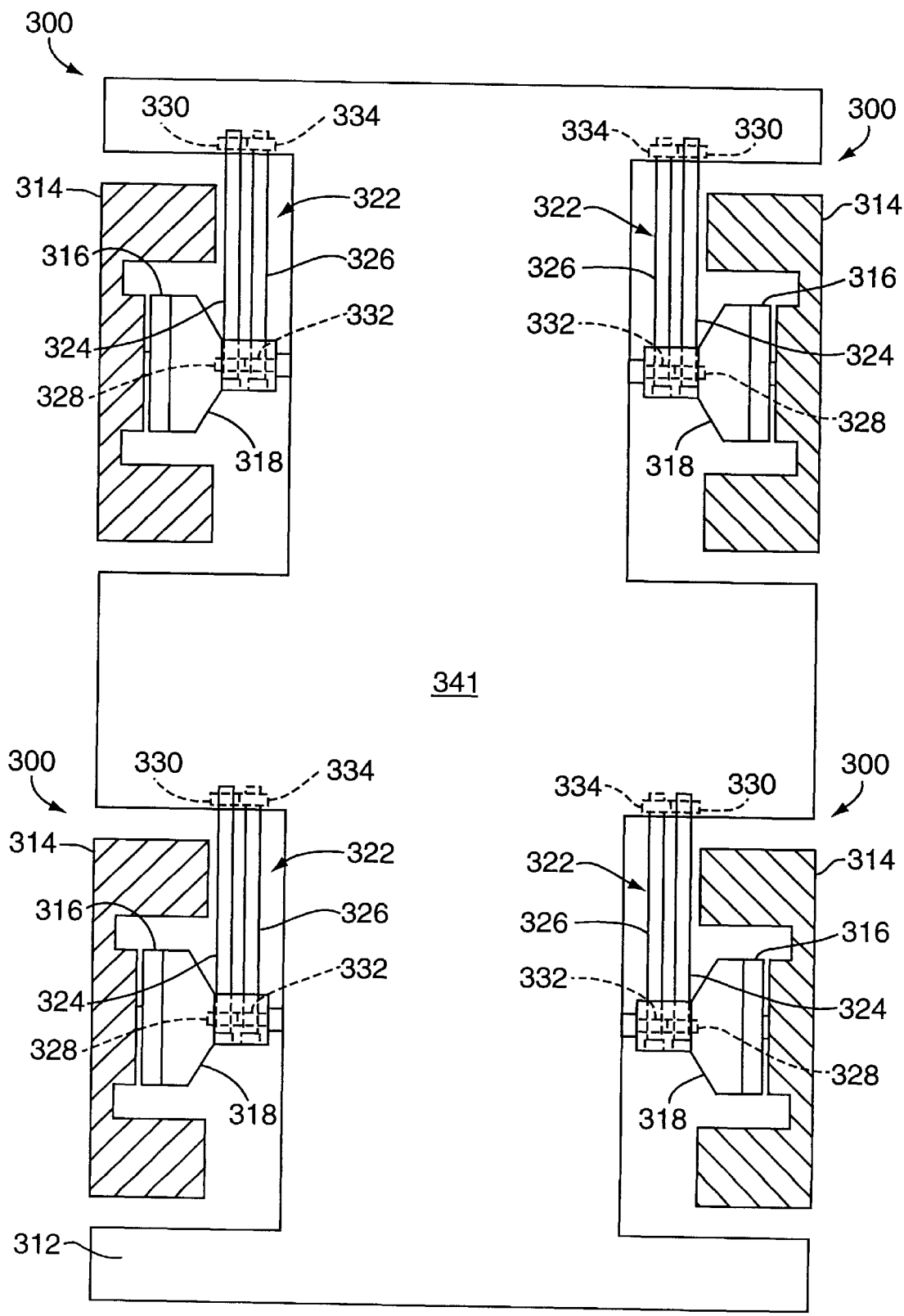
FIG. 14 is a top, partial cross-sectional plan view of a zero roll suspension system according to the embodiment depicted in FIG. 13.

FIG. 14 illustrates a partial cross-sectional plan view of the suspension system 300 of FIG. 13 being incorporated into a vehicle 341, such as but not limited to a front wheel drive vehicle, a rear wheel drive vehicle or a four wheel drive vehicle. FIG. 14 illustrates the linking mechanisms 322 affixed between each wheel assembly 314 and the vehicle frame 312 in a manner as discussed above in conjunction with FIG. 13. While only a single linking mechanism 322 is shown as being affixed between each wheel assembly 314 and the vehicle frame 312 in the cross-sectional plan view of FIG. 14, the present invention is not limited in this regard as pairs of linking mechanisms may be affixed at each wheel assembly 314 location, similar to the arrangement illustrated in FIGS. 2–3, without departing from the broader aspects of the present invention.

Figure 16:
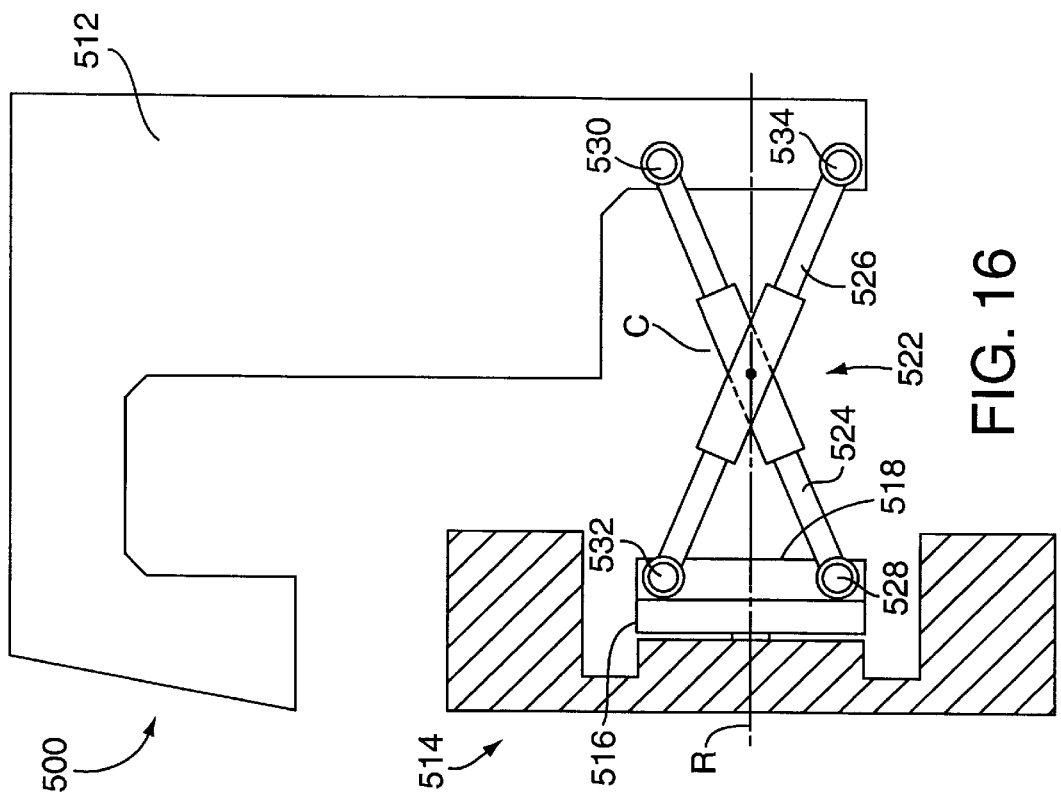
FIG. 16 is a partial cross-sectional view of a zero roll suspension system having variable length elongated members, according to another embodiment of the present invention.
Figure 15:
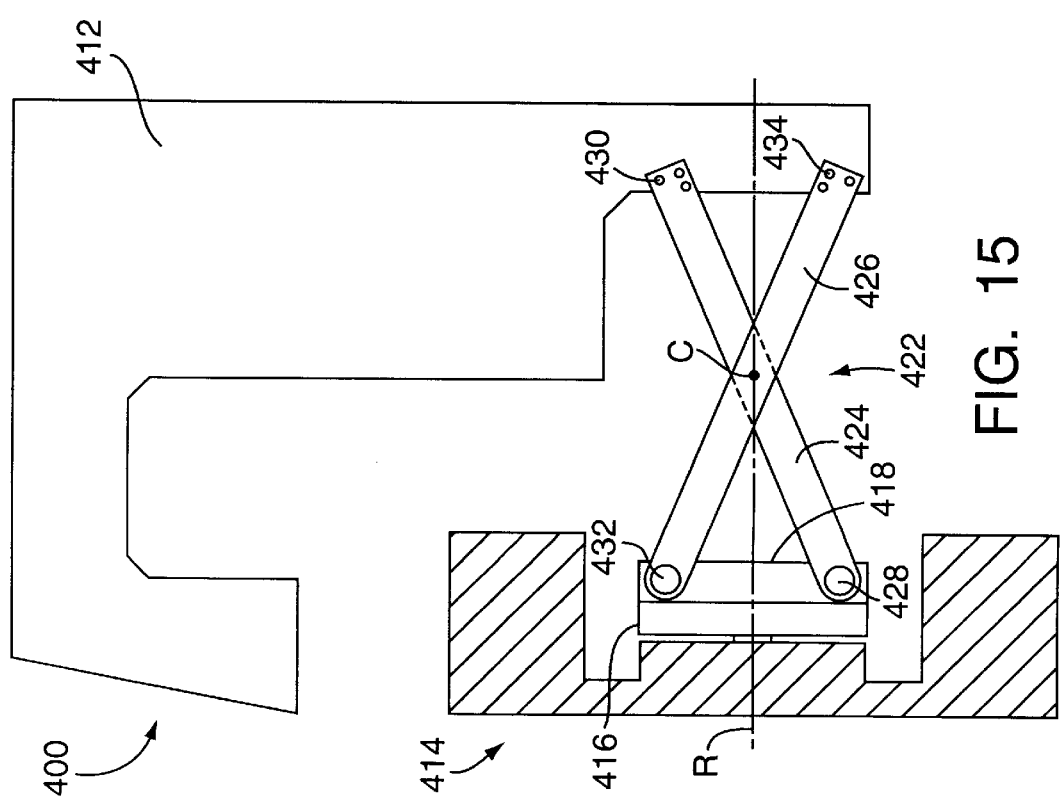
FIG. 15 is a partial cross-sectional view of a zero roll suspension system having flexible, multi-layered composite elongated members, according to another embodiment of the present invention.

As discussed above, FIGS. 1–14 of the present invention are concerned with a plurality of specifically oriented elongated members, preferably formed from any substantially rigid material including but not limited to metal, a metal-alloy, a composite material or the like. Moreover, as was also discussed, each of the elongated members need not be a single unitary element, but rather may be formed from a plurality of mated elements. FIGS. 15 and 16 illustrate two specific examples of alternative design embodiments of the elongated members capable of being utilized in each of the foregoing configurations as depicted in FIGS. 1–14.

FIG. 15 illustrates a zero roll suspension system 400 adapted to be received by the body of a vehicle, such as an automobile frame 412, having a wheel assembly 414, a spindle 416 and a kingpin 418. A crossed linking mechanism 422 acts to connect the wheel assembly 414 to the vehicle body 412. It should be readily apparent that while one linking mechanism 422 has been described, more than one linking mechanism may be alternatively substituted without departing from the broader aspects of the present invention, as has been described in conjunction with the embodiments of FIGS. 1–14.

Referring still to FIG. 15, the linking mechanism 422 of the present invention reverses the moment, preferably at the wheel, to oppose the rolling moment of the vehicle body 412 during cornering. The linking mechanism 422 includes a first elongated member 424 which crosses a second elongated member 426 and performs shock and springing functions in addition to the zero roll attributes discussed previously. The first and second elongated members of this type, 424 and 426 respectively, are preferably formed as flexible members, such as but not limited to multi-layered composite, elongated members having alternating layers of composite fibers and energy dampening elastomeric materials. While FIG. 15 depicts the matched connection points 432 and 428 as being rotatably fixed to the kingpin 418 and the matched connection points 430 and 434 as being non-rotatably fixed to the vehicle frame 412, the present invention is not limited in this regard. The matched connection points 430 and 434 may alternatively be rotatably fixed to the vehicle frame 412 so long as the matched connection points 432 and 428 are non-rotatably fixed to either the spindle 416 or the kingpin 418.

FIG. 16 illustrates a zero roll suspension system 500 according to another embodiment of the present invention. The zero roll suspension system 500 is adapted to be received by the body of a vehicle, such as an automobile frame 512, having a wheel assembly 514, a spindle 516, a kingpin 518 and a spring and shock assembly 520. A crossed linking mechanism 522 acts to connect the wheel assembly 514 to the vehicle body 512. It should be readily apparent that while one linking mechanism 522 has been described, more than one linking mechanism may be alternatively substituted without departing from the broader aspects of the present invention, as has been described in conjunction with the embodiments of FIGS. 1–14.

Referring still to FIG. 16, the linking mechanism 522 of the present invention reverses the moment, preferably at the wheel, to oppose the rolling moment of the vehicle body 512 during cornering. The linking mechanism 522 includes a first elongated member 524 which crosses a second elongated member 526 and performs the zero roll attributes discussed previously. The first and second elongated members of this type, 524 and 526 respectively, are preferably formed as variable length elongated members, such as but not limited to hydraulic or pneumatic cylinders. While FIG. 16 depicts both of the elongated members, 524 and 526 respectively, as being variable length members the present invention is not limited in this regard as only one of the elongated members, 524 and 526 respectively, may alternatively be a variable length member without departing from the broader aspects of the present invention. The connection points 532, 528, 530 and 534 of the elongated members 524 and 526 are configured to be rotatably fixed between the vehicle frame 512 and either the spindle 516 or the kingpin 518 in any conventional manner, such as but not limited to a pin joint or a ball joint, provided that the linking mechanism 522 is freely rotatable about the connection points 532, 528, 530 and 534 during operation of the suspension system 500.

The suspension system 500 advantageously optimizes tire camber, grip and other road handling characteristics of a vehicle when one or both of the elongated members 524 and 526 are selectively lengthened during cornering, braking or accelerating. This may be achieved by elongating one of the elongated members 524 and 526 when the spring and shock assembly 520 is compressed.

In view of the foregoing, the present invention contemplates a zero roll suspension system that reduces cornering roll, acceleration squat and braking dive to nearly zero through the use of crossed mechanical linkages that cancel the rolling moments at each wheel location.

Figure 17:
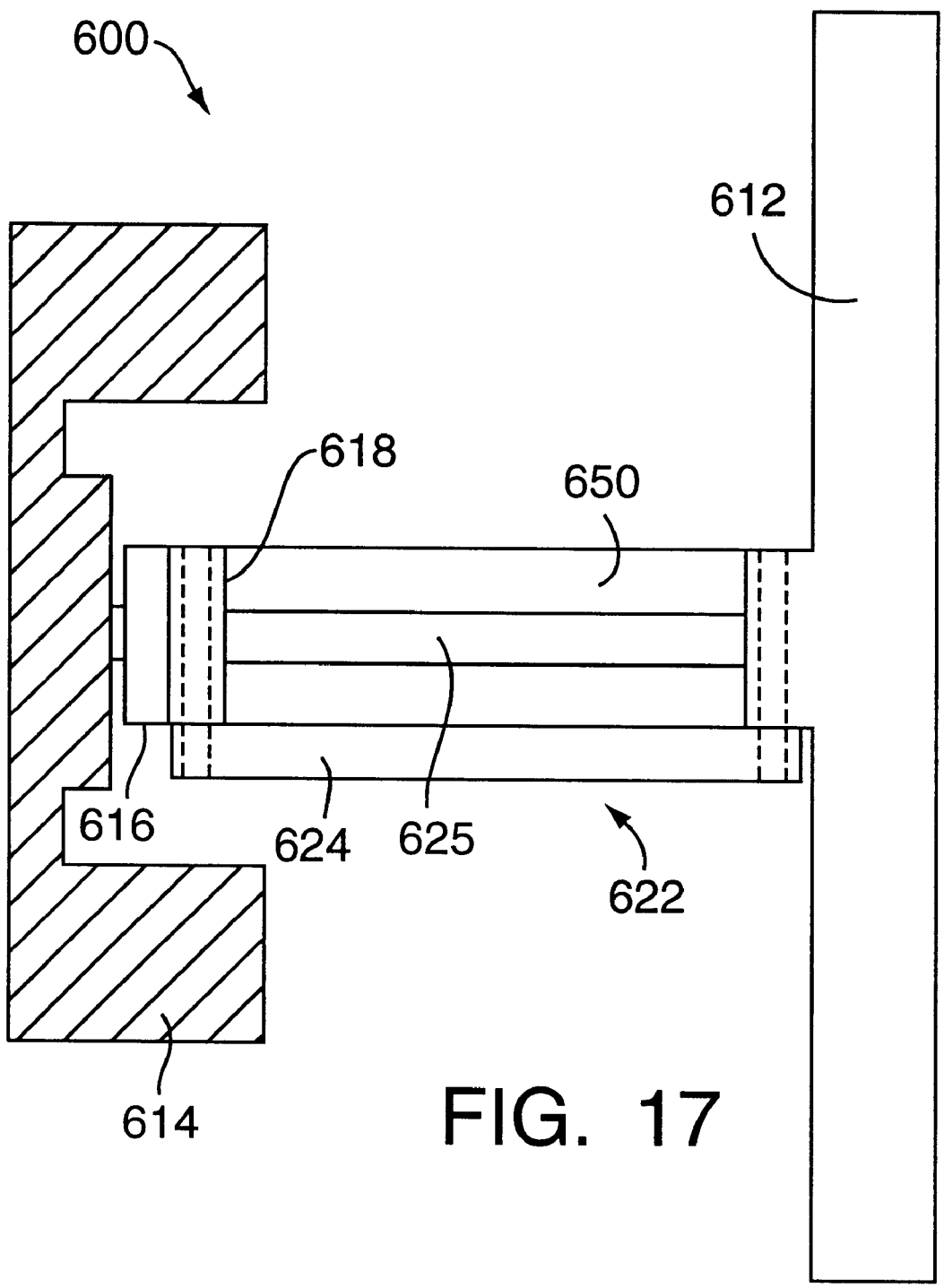
FIG. 17 is a top, partial cross-sectional plan view of a zero roll suspension system according to another embodiment of the present invention in which a toe bar is incorporated.
Figure 4:
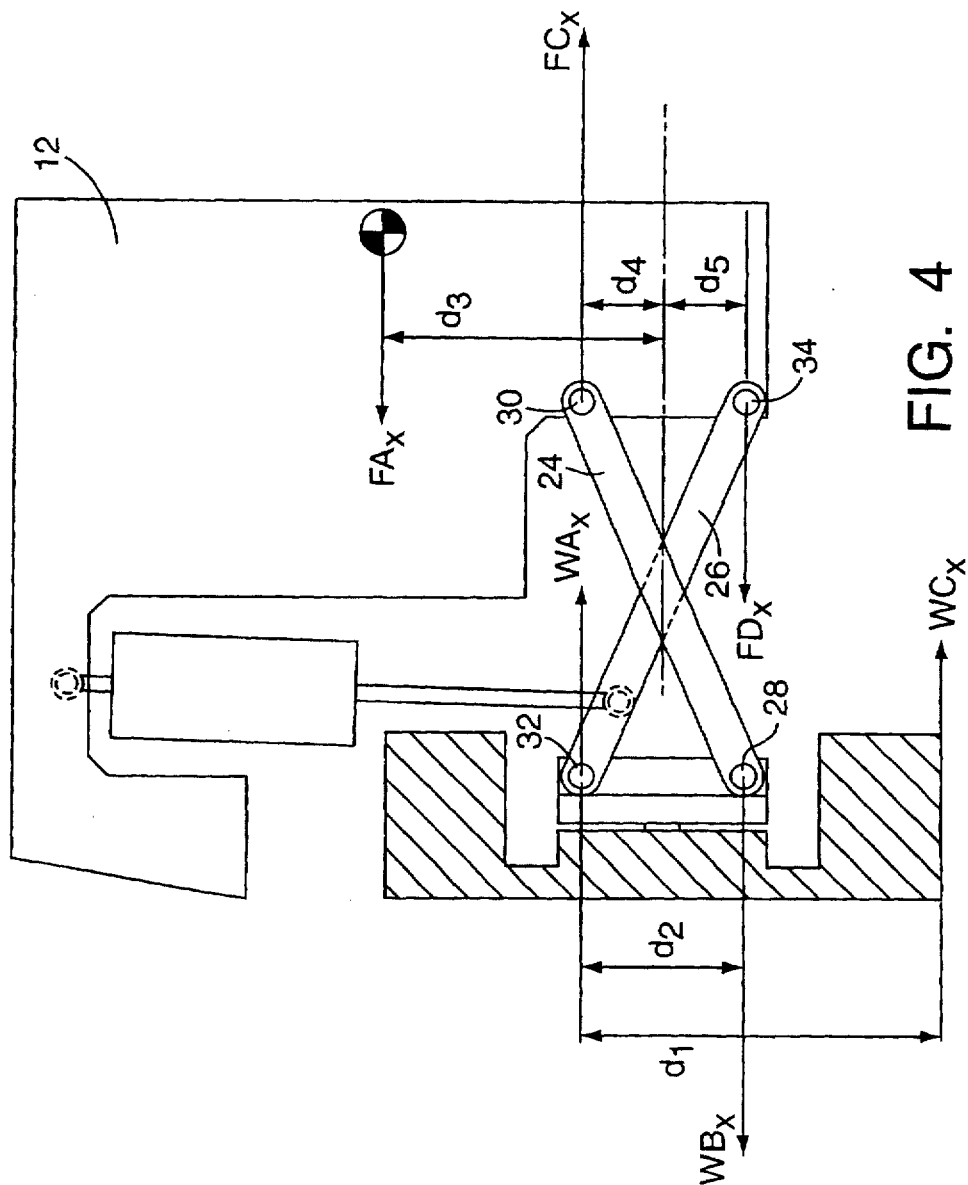
Figure 5:
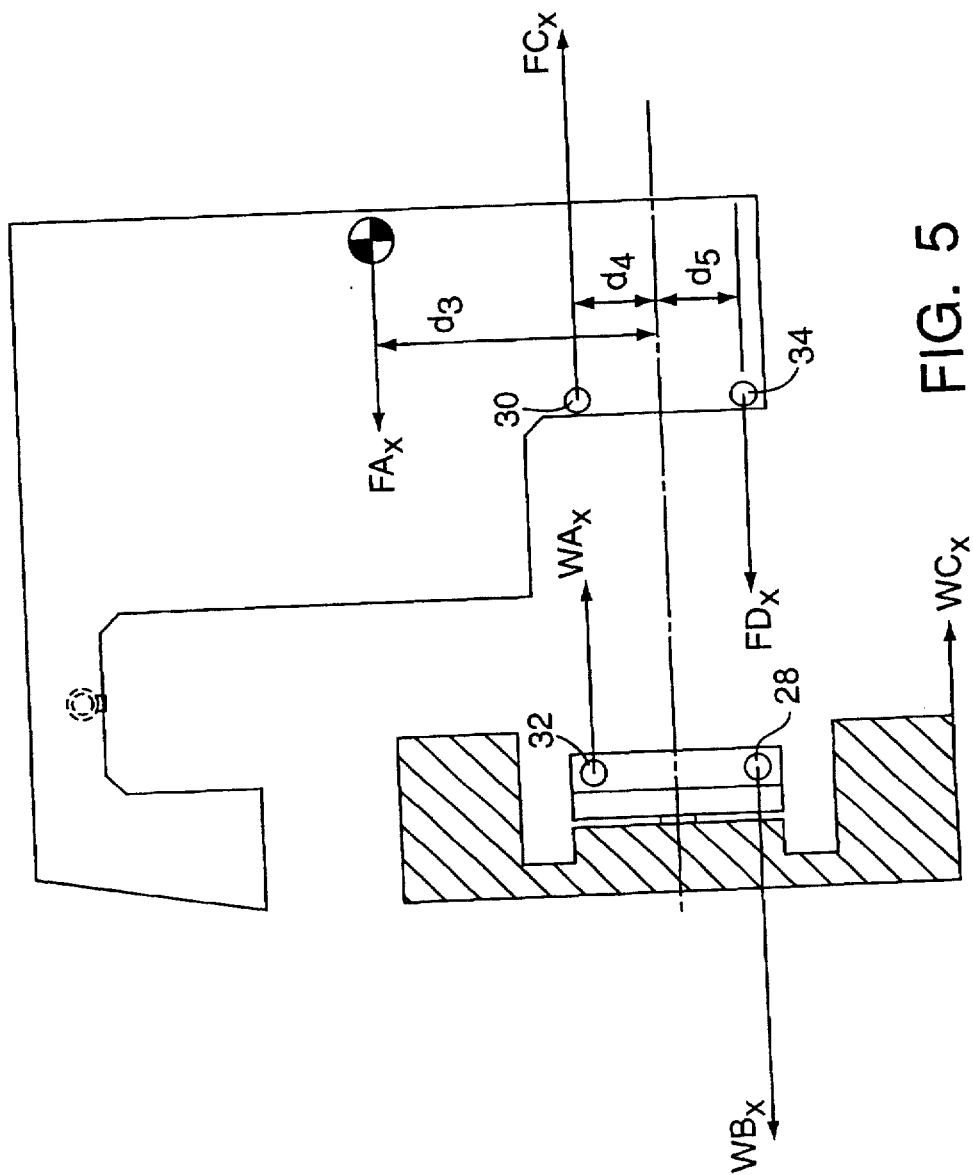
Figure 17:
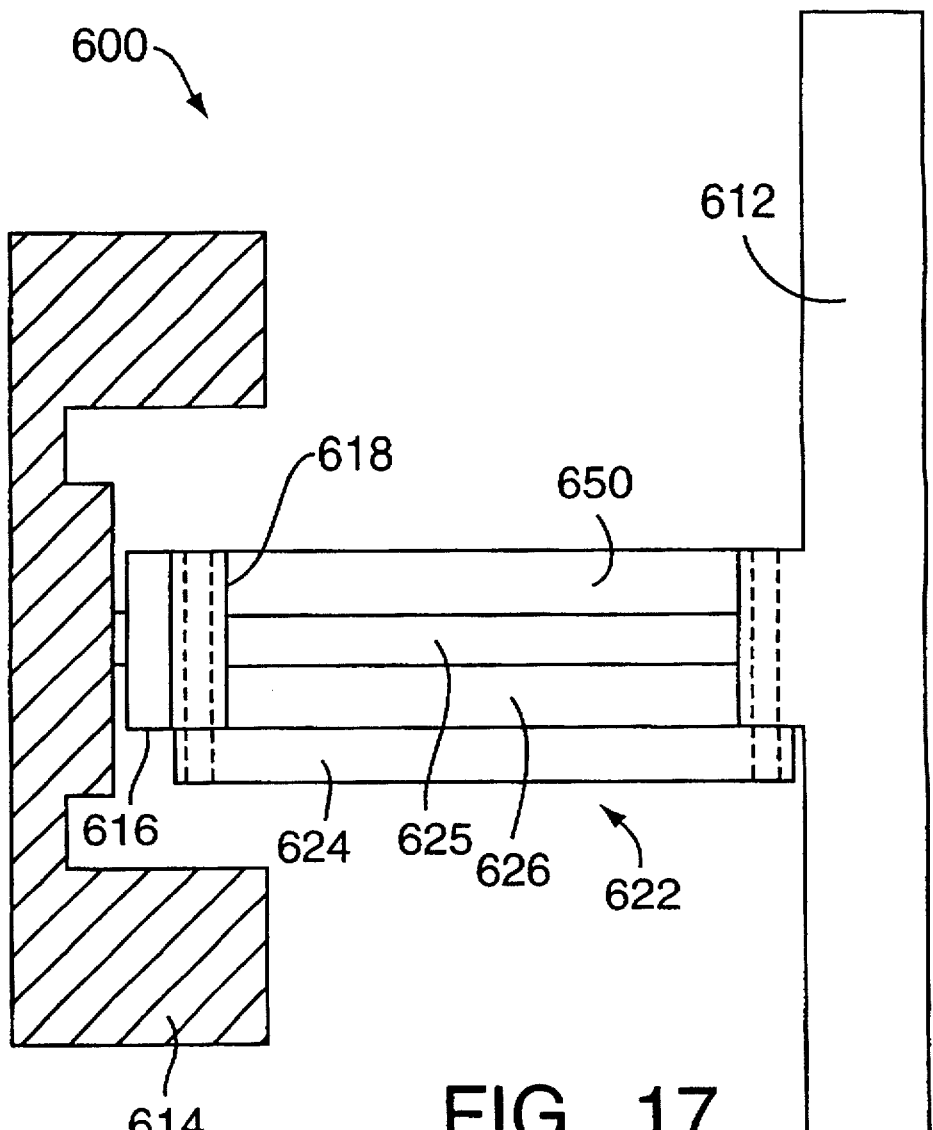

FIG. 17 illustrates a top, partial cross-sectional view of yet another embodiment of a suspension system according to the present invention, generally designated by the reference numeral 600. The suspension system 600 is similar to the suspension systems illustrated in FIGS. 1–16, however the suspension system 600 additionally includes a toe control bar 650 which assists in maintaining the wheel assembly 614 in a proper drive orientation. A linking mechanism 622 includes a pair of crossing members, 624 and 626 respectively, in close association with a drive shaft 625. The crossing members 624 and 626 are rotatably fixed between the vehicle frame 612 and either the spindle 616 or the kingpin 618 on the wheel assembly 614 so as to cross one another in superposition The toe control bar 650 is likewise fixed between the vehicle frame 612 and either the spindle 616 or the kingpin 618 on the wheel assembly 614 in any conventional manner, such as but not limited to a ball joint, so as to allow for a wide range of movement of the toe control bar 650. The toe control bar 650 is preferably oriented so as to be aligned with either one of the crossing members, 624 and 626 respectively, thereby providing the greatest amount of control over the wheel assembly 614.

While the suspension system 600 as depicted in FIG. 17 has been described as including a crossed pair of crossing members, 624 and 626 respectively, which are rotatably fixed between the wheel assembly 614 and the vehicle frame 612, the present invention is not limited in this regard. The crossing members 624 and 626 may be alternatively fixed between the wheel assembly 614 and the vehicle frame 612 in a manner as described in conjunction with FIGS. 15 and 16, depending upon the particular structural nature of the crossing members 624 and 626. Moreover, the arrangement of the crossing members 624 and 626 with respect to the drive shaft 625 and the toe control bar 650 may also be altered from the position indicated in FIG. 17, provided that the crossing members 624 and 626 cross one another in superposition and the toe control bar 650, when viewed horizontally, is substantially aligned with one of crossing members 624 and 626. A pair of elongated members may alternatively be substituted for each of the crossing members 624 and 626, as has been discussed in conjunction with the previously disclosed embodiments of the present invention. The suspension system 600 of FIG. 17 is primarily concerned with the role and orientation of the toe control bar 650 and may be implemented in conjunction with the wheel assemblies of FIGS. 1–16 with or without the drive shaft 625.

It will be readily apparent to one of ordinary skill in the art that attributes of the embodiments as depicted in FIGS. 1–17 may be interchanged with one another without departing from the broader aspects of the present invention.

As discussed previously, a major aspect of the present invention is that the location of the connections points for the linking mechanism may be varied, provided that the elongated members of the linking mechanism remain crossed, so as to allow a desired amount of vehicle frame roll. Slight adjustments in the specific location of these connection points provide for the cambering by the wheels into a corner to thereby improve the cornering grip of a vehicle so equipped. Moreover, although the elongated members of the linking mechanism, including the various embodiments thereof, may cross one another in parallel planes as viewed horizontally, the present invention is not limited in this regard as the elongated members may have any planar relationship between one another provided that when viewed horizontally, the elongated members cross in superposition.

Another major aspect of the present invention is that the rotational axis of the wheel assembly and the crossing axis of the linking mechanism are not required to be at any predetermined angle to one another in order for the beneficial aspects of the present invention to be realized. That is, the rotational axis and the crossing axis need not necessarily be either approximately perpendicular or approximately parallel, but rather they may be at any angle to one another given a specific configuration of the connection points on the wheel assembly and vehicle frame.

Although the present invention has been illustrated and described with reference to preferred embodiments, it will be appreciated by those of ordinary skill in the art, that various modifications to this invention may be made without departing from the spirit and scope of the invention.

I claim:

1. A zero roll suspension system for a vehicle including a vehicle frame and a wheel assembly having an axis of rotation about which a wheel of said wheel assembly rotates, said suspension system substantially eliminating rolling of said vehicle frame and comprising:
   a first weight bearing member;
   a second weight bearing member;
   said first and second weight bearing members each having a first end and a second end, wherein one of said first and second ends of each of said first and second weight bearing members are rotatably connected to a portion of said wheel assembly and the other of said first and second ends of each of said first and second weight bearing members are rotatable connected to-said vehicle frame; and
   said first and second weight bearing members are oriented in substantially parallel planes between said wheel assembly and said vehicle frame and cross one another in superposition along a crossing axis, wherein said vehicle frame is substantially prohibited from rolling during a cornering operation of said vehicle.

2. The zero roll suspension system for a vehicle including a vehicle frame and a wheel assembly having an axis of rotation about which a wheel of said wheel assembly rotates according to claim 1, wherein:
   said suspension system further comprises a control bar, said control bar movably mated to said wheel assembly and said vehicle frame and oriented so as to be approximately aligned with one of said first weight bearing member and said second weight bearing member.

3. The zero roll suspension system for a vehicle including a vehicle frame, and a wheel assembly having an axis of rotation about which a wheel of said wheel assembly rotates according to claim 1, wherein:
   said first and second weight bearing members each include one of a single element and a plurality of mated elements; and
   said crossing axis and said rotational axis have a predetermined angle between one another.

4. The zero roll suspension system for a vehicle including a vehicle frame and a wheel assembly having an axis of rotation about which a wheel of said wheel assembly rotates according to claim 3, wherein:
   said first and second weight bearing members are selectively variable in length.

5. The zero roll suspension system for a vehicle including a vehicle frame and a wheel assembly having an axis of rotation about which a wheel of said wheel assembly rotates according to claim 4, wherein:
   said first and second weight bearing members are one of a hydraulic cylinder and a pneumatic cylinder.

6. The zero roll suspension system for a vehicle including a vehicle frame and a wheel assembly having an axis of rotation about which a wheel of said wheel assembly rotates according to claim 5, wherein:

said portion is one of a spindle and a kingpin.

7. The zero roll suspension system for a vehicle including a vehicle frame, and a wheel assembly having an axis of rotation about which a wheel of said wheel assembly rotates according to claim 3, wherein:

wherein said predetermined angle is one of approximately 90° and approximately 0°.

8. The zero roll suspension system for a vehicle including a vehicle frame and a wheel assembly having an axis of rotation about which a wheel of said wheel assembly rotates according to claim 1, wherein:

said first and second weight bearing members each include a pair of elongated members; and said elongated members include one of a substantially rigid material, a flexible composite material, a pneumatic cylinder and a hydraulic cylinder.

9. The zero roll suspension system for a vehicle including a vehicle frame and a wheel assembly having an axis of rotation about which a wheel of said wheel assembly rotates according to claim 1, wherein:

said weight bearing members include flexible composites.

10. A method of providing a zero roll suspension system for a vehicle including a vehicle frame, a wheel assembly, and a linking mechanism having first and second crossing members, said method comprising the steps of:

rotatable connecting said first and second crossing members to said wheel assembly and said vehicle frame; and orienting said first and second crossing members in substantially parallel planes between said wheel assembly and said vehicle frame so as to cross one another in superposition, thereby substantially eliminating rolling of said vehicle frame in response to a cornering operation of said vehicle.

11. The method of providing, a zero roll suspension system for a vehicle including a vehicle frame, a wheel assembly, and a linking mechanism having first and second crossing, members according to claim 10, further comprising the steps of:

forming said first and second crossing members from flexible composites.

12. The method of providing a zero roll suspension system for a vehicle including a vehicle frame, a wheel assembly, and a linking mechanism having first and second crossing members according to claim 10, further comprising the steps of:

forming said first and second crossing members to be selectively variable in length.

13. The method of providing a zero roll suspension system for a vehicle including a vehicle frame, a wheel assembly, and a linking, mechanism having first and second crossing members according to claim 12, further comprising the steps of:

movably mating a control bar to said wheel assembly and said vehicle frame and oriented so as to be aligned with one of said crossing members.

14. The method of providing a zero roll suspension system for a vehicle including a vehicle frame, a wheel assembly, and a linking mechanism having, first and second crossing members according to claim 12, further comprising the steps of:

forming said first and second crossing members to include one of a hydraulic cylinder and a pneumatic cylinder.

15. The method of providing a zero roll suspension system for a vehicle including a vehicle frame, a wheel assembly, and a linking mechanism having first and second crossing members according to claim 10, further comprising the steps of:

forming each said crossing members as a pair of elongated members, each of said pair of elongated members having a first end and a second end;

attaching one of said first and second ends of each of said elongated members to said wheel assembly;

attaching the other of said first and second ends of each of said elongated members to said vehicle frame; and orienting said pairs of elongated members so that said first end of one of said pairs of elongated members is attached above one of said first and second ends of the other pair of elongated members, and said second end of one of said pairs of elongated members is attached below one of said first and second ends of the other pair of elongated members, said pairs of elongated members thereby crossing one another in superposition.

\* \* \* \* \*

UNITED STATES PATENT AND TRADEMARK OFFICE
CERTIFICATE OF CORRECTION

PATENT NO. : 6,173,978 B1  
DATED : January 16, 2001  
INVENTOR(S) : J. Todd Wagner Page 1 of 4

It is certified that error appears in the above-identified patent and that said Letters Patent is hereby corrected as shown below:

Drawings,
Please substitute Figures 4, 5 and 17, with the attached drawing sheets 3, 4 and 14, consisting of figs. 4, 5 and 17.

Signed and Sealed this

Ninth Day of April, 2002

Attest:

Attesting Officer

JAMES E. ROGAN  
*Director of the United States Patent and Trademark Office*